United States Patent
George, II et al.

(10) Patent No.: US 11,365,121 B2
(45) Date of Patent: Jun. 21, 2022

(54) REACTOR INCORPORATING A HEAT EXCHANGER

(71) Applicant: Battelle Memorial Institute, Columbus, OH (US)

(72) Inventors: Paul E. George, II, Powell, OH (US); Vincent Contini, Powell, OH (US); Matthew E. Goshe, Pickerington, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 162 days.

(21) Appl. No.: 16/817,825

(22) Filed: Mar. 13, 2020

(65) Prior Publication Data

US 2020/0216313 A1 Jul. 9, 2020

Related U.S. Application Data

(60) Division of application No. 15/801,657, filed on Nov. 2, 2017, now Pat. No. 10,604,408, which is a
(Continued)

(51) Int. Cl.
*C01B 3/26* (2006.01)
*F28F 9/02* (2006.01)
(Continued)

(52) U.S. Cl.
CPC ............. *C01B 3/26* (2013.01); *B01J 19/0093* (2013.01); *C01B 3/384* (2013.01); *F28F 9/02* (2013.01);
(Continued)

(58) Field of Classification Search
CPC ... C01B 3/26; C01B 3/384; C01B 2203/0233; C01B 2203/066; C01B 2203/0811;
(Continued)

(56) References Cited

U.S. PATENT DOCUMENTS 5,811,062 A * 9/1998 Wegeng ................. F02G 1/043
422/129
6,447,736 B1 * 9/2002 Autenrieth ............. B01J 19/249
422/601
(Continued)

FOREIGN PATENT DOCUMENTS

EP 1180395 A2 2/2002
EP 2161061 A1 3/2010

*Primary Examiner* — Matthew J Merkling
(74) *Attorney, Agent, or Firm* — Fay Sharpe LLP

(57) ABSTRACT

A reactor containing a heat exchanger is disclosed, which can be operated with co-current or counter-current flow. Also disclosed is a system that includes a reactor having a reformer and a vaporizer, a fuel supply, and a water supply. The reactor includes a source of combustion gas, a reformer operative to receive reformate, and a vaporizer operative to receive water. The reformer and vaporizer each include a stack assembly formed by a combination of separator shims and channel shims. The separator shims and channel shims are stacked in a regular pattern to form two sets of channels within the stack assembly. One set of channels will have vertical passageways at either end and a horizontal flowpath between them, while the other set of channels has only a horizontal flowpath.

19 Claims, 23 Drawing Sheets

Related U.S. Application Data continuation of application No. 14/205,827, filed on Mar. 12, 2014, now Pat. No. 9,834,441.

(60) Provisional application No. 61/777,935, filed on Mar. 12, 2013.

(51) Int. Cl.
*B01J 19/00* (2006.01)
*C01B 3/38* (2006.01)
*H01M 8/0612* (2016.01)

(52) U.S. Cl.
CPC .... *H01M 8/0625* (2013.01); *B01J 2219/0086* (2013.01); *B01J 2219/00783* (2013.01); *B01J 2219/00806* (2013.01); *B01J 2219/00822* (2013.01); *B01J 2219/00835* (2013.01); *B01J 2219/00873* (2013.01); *B01J 2219/00898* (2013.01); *C01B 2203/0233* (2013.01); *C01B 2203/066* (2013.01); *C01B 2203/0811* (2013.01); *C01B 2203/1035* (2013.01); *C01B 2203/1064* (2013.01); *C01B 2203/1276* (2013.01); *C01B 2203/1288* (2013.01); *C01B 2203/142* (2013.01); *F28F 2260/02* (2013.01)

(58) Field of Classification Search
CPC .... C01B 2203/1035; C01B 2203/1064; C01B 2203/1276; C01B 2203/1288; C01B 2203/142; B01J 19/0093; B01J 2219/00783; B01J 2219/00806; B01J 2219/00822; B01J 2219/00835; B01J 2219/0086; B01J 2219/00873; B01J 2219/00898; F28F 9/02; H01M 8/0625

See application file for complete search history.

(56) References Cited

U.S. PATENT DOCUMENTS

| | | | |
|---|---|---|---|
| 6,680,044 B1 | 1/2004 | Tonkovich et al. | |
| 7,401,712 B2 | 7/2008 | Kaye et al. | |
| 7,501,101 B2 | 3/2009 | Wegeng et al. | |
| 7,527,661 B2* | 5/2009 | Chellappa | C01B 3/505 48/197 R |
| 7,999,144 B2 | 8/2011 | Tonkovich et al. | |
| 2003/0072699 A1 | 4/2003 | Tonkovich et al. | |
| 2003/0180216 A1* | 9/2003 | TeGrotenhuis | C01B 3/16 423/659 |
| 2003/0221554 A1* | 12/2003 | TeGrotenhuis | H01M 8/04171 95/45 |
| 2004/0013585 A1* | 1/2004 | Whyatt | C01B 3/384 422/177 |
| 2004/0033455 A1 | 2/2004 | Tonkovich et al. | |
| 2004/0099712 A1 | 5/2004 | Tonkovich et al. | |
| 2004/0228781 A1 | 11/2004 | Tonkovich et al. | |
| 2005/0069735 A1 | 3/2005 | George, II et al. | |
| 2005/0247552 A1 | 11/2005 | TeGrotenhuis et al. | |
| 2006/0045842 A1 | 3/2006 | Wegeng et al. | |
| 2008/0253944 A1 | 10/2008 | Whyatt et al. | |
| 2009/0280369 A1 | 11/2009 | Chick et al. | |
| 2010/0143755 A1 | 6/2010 | Fischer et al. | |
| 2011/0180242 A1* | 7/2011 | Urata | F28F 9/02 165/166 |
| 2012/0028142 A1 | 2/2012 | Whyatt et al. | |
| 2012/0091036 A1 | 4/2012 | George, II et al. | |
| 2012/0094204 A1 | 4/2012 | Dano et al. | |

* cited by examiner

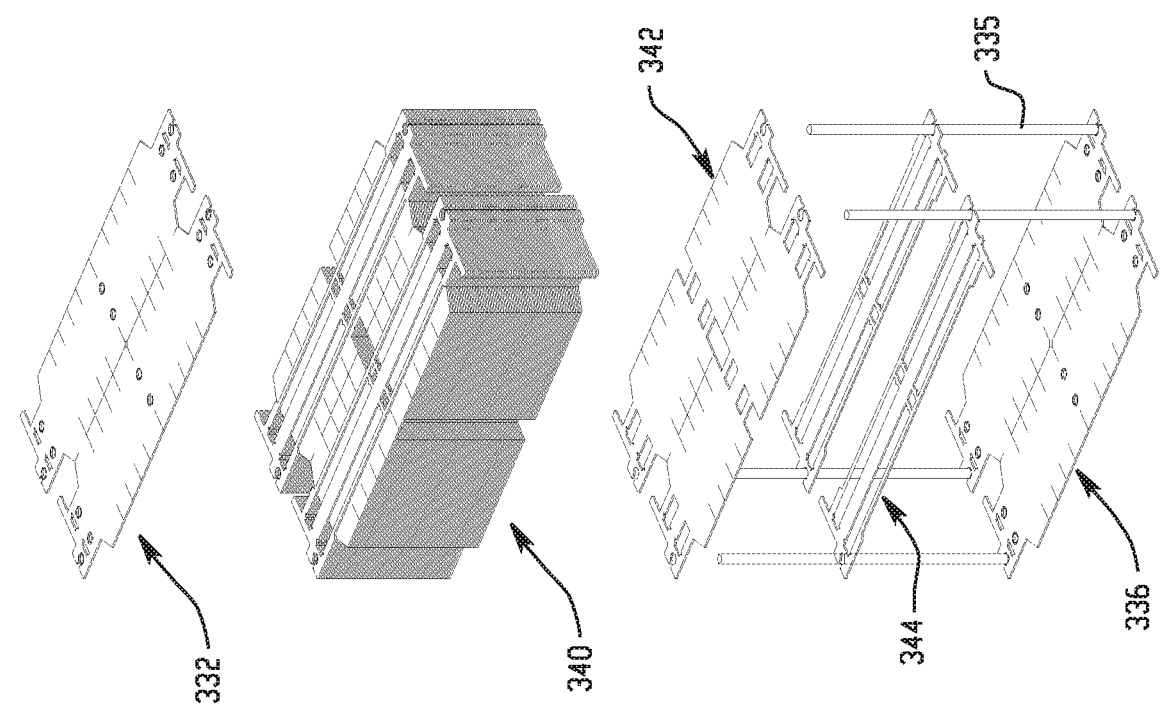
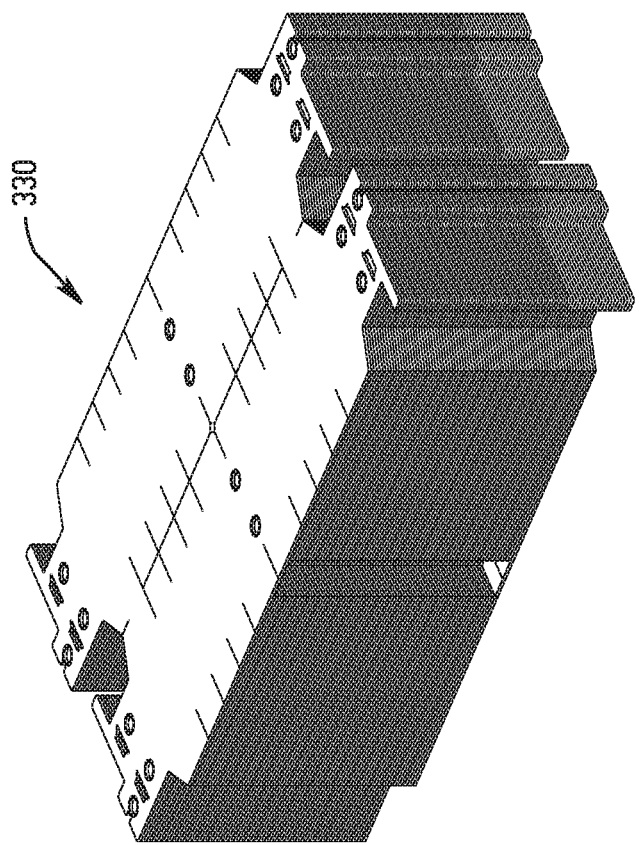
Fig. 9

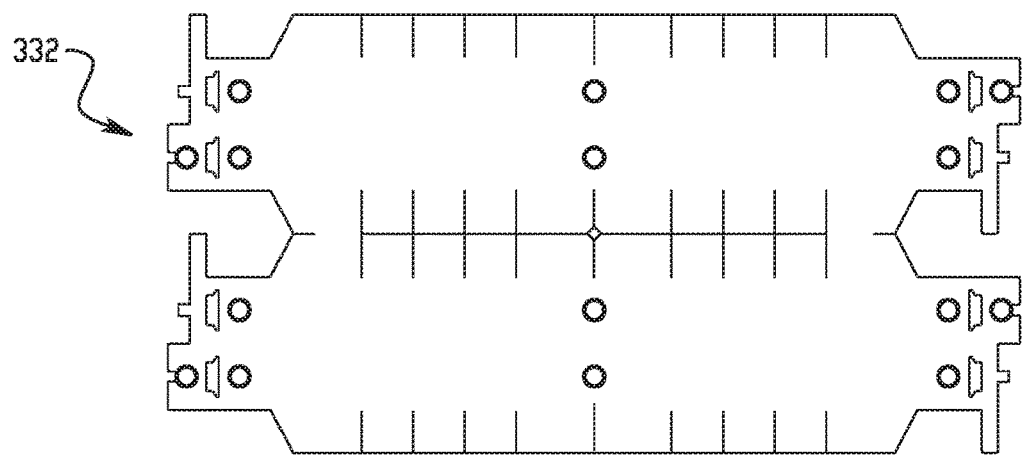
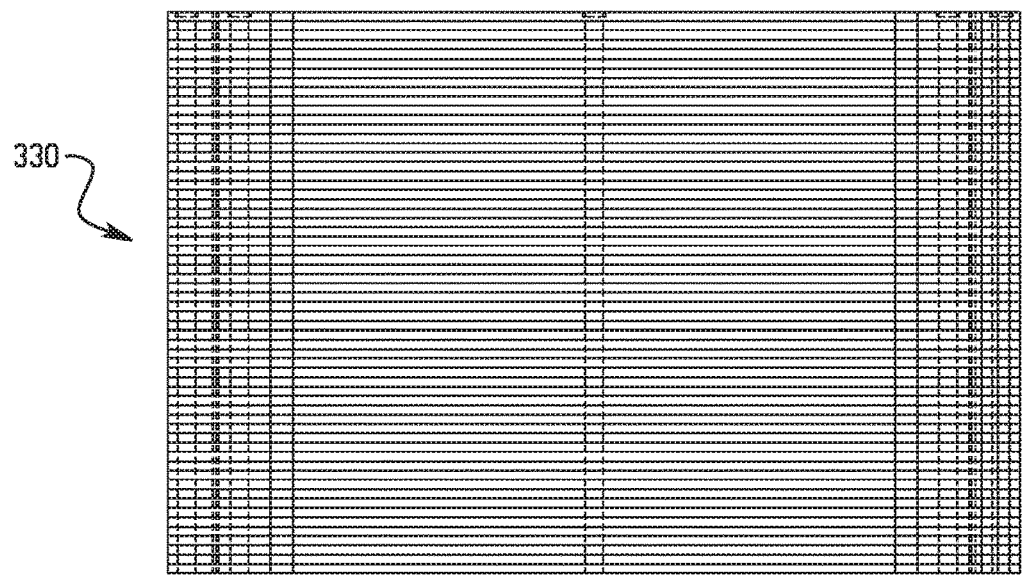
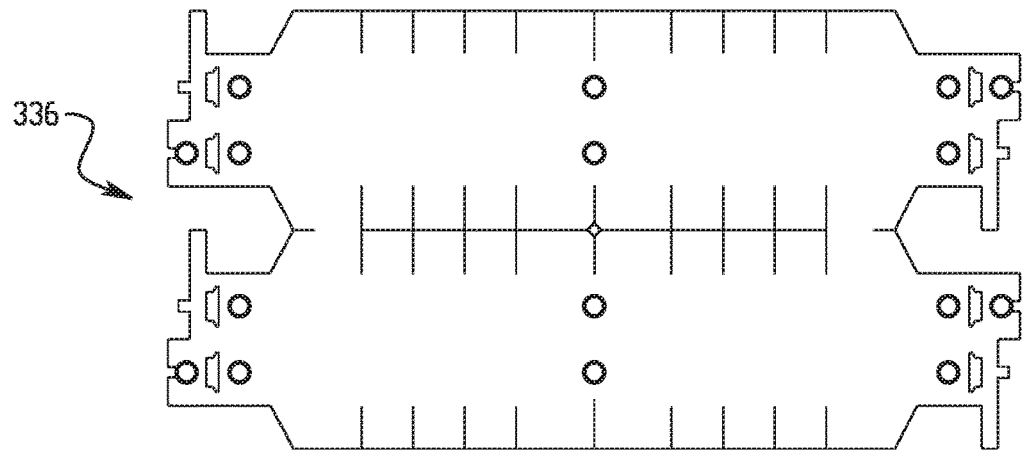
Fig. 11

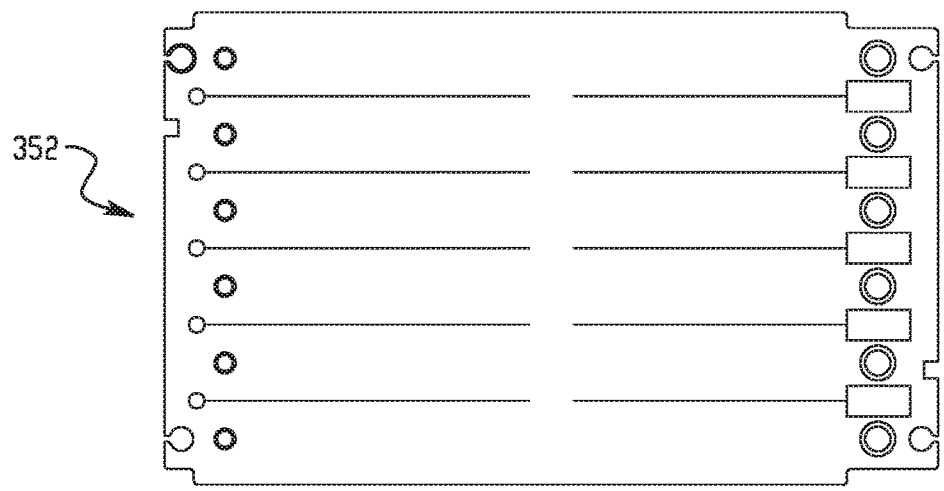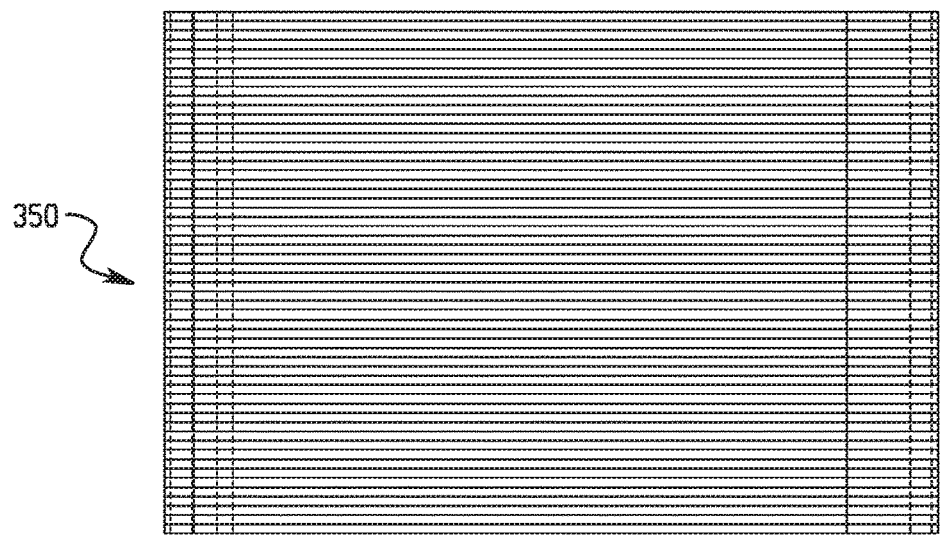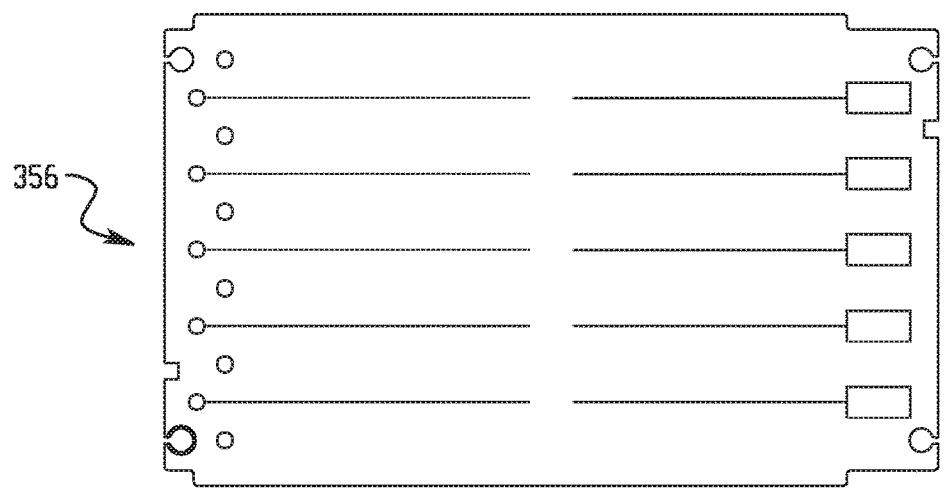
Fig. 15

REACTOR INCORPORATING A HEAT EXCHANGER

CROSS-REFERENCE TO RELATED APPLICATIONS

This application is a divisional of U.S. patent application Ser. No. 15/801,657, filed Nov. 2, 2017, which is a continuation of U.S. patent application Ser. No. 14/205,827, filed Mar. 12, 2014, now U.S. Pat. No. 9,834,441, which claims priority to U.S. Provisional Patent Application Ser. No. 61/777,935, filed Mar. 12, 2013. The entirety of that application is hereby fully incorporated by reference herein.

BACKGROUND

The present disclosure relates to heat exchangers, systems, methods, and devices for performing an energy intensive reaction, either exothermic or endothermic. The devices disclosed herein are particularly applicable to steam/hydrocarbon reforming, and can also be used in other applications. Generally, the system may be used to generate electricity by reforming a mixture of steam and hydrocarbon fuel in a fuel processor that outputs hydrogen gas to a fuel cell. The method for forming the heat exchanger may include diffusion bonding of a stack of alternating shims of appropriate design. The heat exchanger can be used in a reactor usable in connection with different types of fuel cells, e.g., proton-exchange membrane fuel cell (PEMFC) and solid oxide fuel cell (SOFC), to generate electricity in an effective and low cost manner. The device may also include a counter-flow configuration and/or lateral heat transfer between reactant gases and combustion gases to enhance thermal flow and overall efficiency.

Fuel cells serve as a popular alternative to other energy sources due to their high efficiency and relatively benign reaction byproducts. Fuel cells produce electricity through an electrochemical reaction between a fuel input and an oxidant. Many fuel cells to date have been designed to use hydrogen as the fuel input. However, storing large quantities of needed hydrogen gas for the fuel cell has often proved to be impracticable. To address the known disadvantages of hydrogen gas storage, systems to produce hydrogen gas on-demand have been developed.

One type of fuel processor system generates hydrogen on-demand by reforming a hydrocarbon fuel into usable hydrogen. The hydrocarbon fuels used by this fuel processor system are easier to store using existing storage infrastructure relative to hydrogen gas. Reforming hydrocarbon fuel into hydrogen gas requires steam to oxidize the hydrocarbon fuel into carbon monoxide (CO) and hydrogen ($H_2$), typically in the presence of a catalyst. Steam reforming is also a strongly endothermic reaction that must be performed at high temperature to improve the yield of hydrogen gas produced. Therefore, effective thermal management between reactant gas and combustion gas flowing within a fuel processor system is crucial to maintain reaction temperatures.

Current fuel processor systems include a fuel processor which receives a reformate input (steam and hydrocarbon fuel reactant mixture) and produces a syngas output (hydrogen and carbon monoxide). In some known systems, the hot combustion gas flows in channels that are perpendicular (i.e. at a 90° angle) to the channels through which the reformate input flows, a configuration referred to as a cross-flow panel configuration. In other known systems, the hot combustion gas flows in the same direction as reformate input along parallel channels, also known as co-flow. In yet other known systems, the hot combustion gas flows in an opposite direction to reformate input along parallel channels, a configuration referred to as counter-flow. Counter-flow may be a preferred method for reactions having a large temperature differential between hot combustion gas and reactant gas. Counter-flow is believed to be more advantageous than a cross-flow or co-flow configuration because it enables more efficient lateral heat transfer between reactant gases flowing within reaction channels and combustion gases flowing within combustion channels.

Current heat exchangers present many limitations, including high fabrication costs, large size, and sensitivity to carbon formation. These heat exchangers are also expensive to make. One reason for the high fabrication expense is the number of high-skilled welds, both internal and external, that are required. For example, pressure welds are currently used to fabricate fuel processors. A large number of high-skilled pressure welds are required to assemble reactor panels into panel sets and then panel assemblies.

It would be desirable to provide heat exchangers that are easier to make, less costly, and less sensitive to carbon formation. These heat exchangers may provide lateral heat transfer between reactant gases and combustion gases to enhance thermal flow and overall efficiency. The heat exchangers may be used as fuel processors for steam reforming or similar reactions.

BRIEF DESCRIPTION

The present disclosure relates to heat exchangers, systems, methods, and devices for transferring heat between two different flowpaths. Such devices can be useful in fuel reformation or other similar reactions. The present disclosure describes methods for forming stack assemblies employing diffusion bonding of simple shims as opposed to welding or bonding of finely-detailed shims as has been practiced previously. The simple shims can be designed for self-fixturing, which simplifies the bonding process and reduces costs. The configuration described may further allow for increased total catalyst loading for a reactor of given size. A shim design based on simple geometric scaling can cut the cost of traditional fabrication methods employing numerous high-skilled welds and fine-detailed shims. A reactor can include stacks of reformer and vaporizer shims arranged in a compact, linear configuration. The compact and low-cost nature of the device permits the device to be used for commercial applications or alternatively scaled up for industrial applications. For example, the reactor can be used as a fuel processor for fuel reformation. Heat transfer in the reactor can occur via co-flow or counter-flow configurations.

Disclosed in embodiments is a heat exchanger (800, 110, 510, 610, 590), comprising a first channel, a second channel, and a fin. The first channel (810, 134, 135, 138, 139, 151) has a flowpath, a first wall (805), a second wall (832) opposite the first wall, an inlet manifold (812, 124, 120, 620, 640) at a first end, and a outlet manifold (814, 128, 122, 628, 648) at a second opposite end. The inlet manifold and the outlet manifold are orthogonal to the flowpath of the first channel The second channel (820, 133, 137, 153) has a flowpath parallel to the horizontal flow path of the first channel, the first channel and the second channel being separated by the first wall. The fin (845, 341, 361, 556) extends from the second channel into the first channel, the fin passing through the first wall (805) and extending to the second wall (832).

In embodiments, the first channel (810, 134, 135, 138, 139, 151) has a plurality of micro-channels (811) and the second channel (820, 133, 137, 153) has a plurality of micro-channels (821). The ratio of a first micro-channel width (836) to a first micro-channel height (834) is from 2:1 to 20:1.

The heat exchanger can be formed from a channel shim (830, 344, 364, 540) and a separator shim (840, 342, 362, 550), wherein the channel shim defines the first channel, wherein the separator shim includes the fin. In some embodiments, the ratio of a channel shim height (834) to a separator shim height (844) may be from 0.125 to 8, including from 0.5 to 2.

The channel shim (830, 344, 364, 540) may comprise at least one micro-channel (346, 348, 365, 547, 548) extending from a first end (541) of the channel shim to a second end (542) of the channel shim. The micro-channel (346, 348, 365) may further comprises a mixing manifold (347). The separator shim (840, 342, 362) may further comprise slots (386, 432, 434) that align with the micro-channel of the channel shim.

In some embodiments, the micro-channel (365) of the channel shim (364) can be formed from two longitudinal walls (366) joined together by at least one transverse support (367), the micro-channel thus being separated into a series of chambers, wherein the chamber at a first end of the micro-channel is shorter in length than the other chambers. The transverse supports also provide cross-support to the longitudinal walls to aid in maintaining their shape until they are bonded together.

In other embodiments, the channel shim (364, 540) has only one notch (369, 549) on an end. The channel shim (830, 344) can further comprise alignment tabs (383) on opposite corners. Sometimes, the channel shim (830, 344, 364) further comprises notches (381, 368, 369) on opposite ends.

The separator shim (840, 342, 362) can further comprise a mixing manifold (345). The separator shim (840, 342, 362) can sometimes further comprise alignment tabs (385) on opposite corners. The separator shim (840, 342, 362) could alternatively further comprise notches (387, 420, 422, 424) on opposite corners. The separator shim (840, 342, 362) may further comprise indents (380, 426) on an end.

The heat exchanger, in some embodiments, further comprises a combustion gas source (111, 202, 611) at an end of the heat exchanger opposite the inlet manifold (812, 124, 120, 620, 640) of the first channel.

In some embodiments, the channel shim (540) comprises: an entry end (541) and a return end (542); two outer walls (543) and a central wall (544) that define two micro-channels (547, 548); and an alignment slot (545) in the central wall. In those embodiments, the separator shim (550) comprises: an entry end (551) and a return end (542); a central slot (557) at the return end; two recesses (553) at the entry end that align with the micro-channels (547, 548) of the channel shim (540); and an alignment slot (555) that aligns with the alignment slot (545) of the channel shim.

Also disclosed herein is a system (100, 200) for steam reforming, comprising: a reactor (110, 210) including a reformer (132, 136, 232, 236) and a vaporizer (152, 154, 252, 254); a fuel supply (171, 271) for providing fuel to the reactor; and a water supply (199, 299) for providing water to the reactor. The vaporizer (152) operates to generate steam from the water and the reformer (132) operates to generate hydrogen from a reformate mixture including the steam and the fuel.

The system may further comprise a start-up combustor (102) attached to the reactor (110). The reactor (110, 210) can alternatively include a burner (111, 202) for combusting scrap reformate. In another embodiment, the start-up combustor (102) acts to combust scrap reformate. The combustion gas provided by the start-up combustor (102) or the burner (111, 202) may flow counter-current to the flow of the reformate within the reactor (110). The combustion gas provided by the start-up combustor (102) or the burner (111, 202) may flow counter-current to the flow of the water within the reactor (110).

The system may further include a fuel cell assembly (181, 281) connected to the reactor (110, 210) for producing electricity. The fuel cell assembly (181) can include a proton exchange membrane fuel cell (PEMFC). In embodiments, the PEMFC is operative to generate from about 6 kW to about 8 kW of electricity. However, the PEMFC can be applied to generate power from about 1 kW to about 1 megawatt of electricity. Alternatively, the fuel cell assembly (281) includes a solid oxide fuel cell (SOFC).

The reformer (132, 136, 232, 236) or the vaporizer (152, 154, 252, 254) can include a stack assembly formed from a regular alternating pattern of a separator shim and a channel shim.

Also disclosed herein is a method (S100) for forming a reactor, comprising: alternatingly stacking reformer channel shims (344) and reformer separator shims (342) to form a reformer shim stack (340); bonding the reformer shim stack (340) to reformer plates (332, 336) to form a reformer stack assembly (330); alternatingly stacking vaporizer channel shims (362) and vaporizer separator shims (364) to form a vaporizer shim stack (360); bonding the vaporizer shim stack (360) to vaporizer plates (352, 356) to form a vaporizer stack assembly (350); and arranging the reformer stack assembly (330) and vaporizer stack assembly (350) within a casing (119); wherein the reformer stack assembly includes a reaction channel and a combustion channel, wherein the vaporizer stack assembly includes a vaporizer channel and a combustion channel, and the reformer stack assembly combustion channel communicates with the vaporizer stack assembly combustion channel to direct flow from the reformer stack assembly combustion channel into the vaporizer stack assembly combustion channel.

The arranging may further include arranging the inlets and outlets of the stack assemblies (340, 360) so that reactants and water flow in a counter-current direction to combustion gas. The method can further comprise placing a second reformer stack assembly in series with the reformer stack assembly (340); or further comprise placing a second vaporizer stack assembly in series with the vaporizer stack assembly (360).

Any of the shims 342, 344, 362, 364 can be made by a wire electrical discharge machining (EDM), water jet, laser cutting, or stamping production method. The bonding of the reformer shim stack 340 or the vaporizer shim stack 360 can be performed by diffusion bonding or brazing. In some instances, automated welding may also be used. Sometimes, two channel shims (344) are stacked between each separator shim (342).

Also disclosed in various embodiments herein is a fuel processing device (800, 110, 510, 610), comprising: a combustion gas source (111, 102, 211, 202, 516, 611); a reaction channel (134, 135, 138, 139, 506, 632, 636) having an inlet (124) and an outlet (128); a vaporizer channel (151, 652, 654) having an inlet (120) and an outlet (122); and a combustion channel (133, 153, 502, 504); wherein combustion gas from the combustion gas source flows through the combustion channel. The reaction channel inlet and the vaporizer channel inlet can be arranged so that flow through the reaction channel and the vaporizer channel are counter-current to the combustion gas flow.

The combustion gas source may be at least one of a burner (111, 211) and start-up combustor (102, 202).

The device may further include at least one adiabatic reformer (117,118) connected to the reaction channel outlet.

The reaction channel may include a catalyst (131), such as rhodium on spinel. The catalyst (131) can be inserted into the reaction channel as a catalyst insert (734). The catalyst insert (734) may comprise a corrugated center piece (730) coated on at least one side with the catalyst. The corrugated center piece (730) can be sandwiched between two flat shims (736), wherein an inner surface (735) of each flat shim is also coated with the catalyst. Alternatively, the surfaces of the channel (134) may be coated with catalyst.

In some embodiments, the combustion gas source is located at a burner end (505) of the device, and wherein the combustion channel (502, 504) includes (i) a first leg (521) running from the burner end to an opposite end (501) of the device and (ii) a second leg (523) returning from the opposite end to the burner end.

Sometimes, the reaction channel (506) and the vaporizer channel each include (i) a first leg (525) running from the burner end to an opposite end of the device and (ii) a second leg (527) returning from the opposite end to the burner end.

In some embodiments, the reaction channel (632, 636) flows counter-current to the first leg of the combustion channel and the vaporizer channel (652, 654) flows counter-current to the second leg of the combustion channel.

Also described herein is a heat exchanger assembly (800, 330, 350, 590) formed from a plurality of channel shims (344, 364, 540) and a plurality of separator shims (342, 362, 550). The channel shims and separator shims are stacked in a regular alternating pattern to form a shim stack (340, 360, 590). The channel shims and separator shims operate to form a first channel (810), a second channel (820), and a fin (845, 341, 361, 556) extending from the second channel into the first channel.

The assembly may further comprise a top plate (332, 352) above the shim stack and a bottom plate (336, 356) below the shim stack. The channel shims and the separator shims can be diffusion bonded together.

In embodiments, the first channel (810) has a plurality of micro-channels (811) and the second channel (820) has a plurality of micro-channels (821) The ratio of a first micro-channel width (836) to a first micro-channel height (834) can be from 2:1 to 20:1. The ratio of a channel shim height (834) to a separator shim height (844) can be from 0.125 to 8.

In some embodiments, the channel shim (344, 364) comprises a plurality of micro-channels (346, 348, 365) extending from a first end of the channel shim to a second end of the channel shim.

Each micro-channel (346, 348) can further comprise a mixing manifold (347).

Sometimes, two channel shims are placed between two separator shims and are used to form a single level between the separator shims.

The separator shim (342) can include a slot (386) at each end of the separator shim, each slot aligning with an end of a micro-channel of the channel shim. Sometimes, the separator shim (342) includes a mixing manifold (345) that aligns with a micro-channel of the channel shim. In addition, the separator shim (342) can include a thermal slot (343) at the center of the separator shim.

In some embodiments, each micro-channel (365) of the channel shim (364) is formed from two longitudinal walls (366) joined together by at least one transverse support (367), the micro-channel thus being separated into a series of chambers, wherein the chamber at a first end of the micro-channel is shorter in length than the other chambers. The channel shim (364) may have only one notch (369) on an end.

In other embodiments, the channel shim (364) includes a plurality of micro-channels (365) spaced such that when one channel shim is stacked upon another channel shim, the micro-channels are aligned with each other.

Sometimes, two channel shims (364) are placed between two separator shims, and are used to form two levels between the separator shims, the channel shims being rotated 180° with respect to each other. The separator shim (362) can include a slot (432, 434) at each end of the separator shim, each slot aligning with an end of a micro-channel of the channel shim.

In many different arrangements, the channel shim (344) further comprises alignment tabs (383) on opposite corners; and/or notches (381, 368) on opposite ends. The separator shim (342, 362) can further comprise alignment tabs (385) on opposite corners; notches (387, 424) on opposite corners; and/or indents (380, 426) on an end.

In particular embodiments of the assembly (590), the channel shim (540) comprises: an entry end (541) and a return end (542); two outer walls (543) and a central wall (544) that define two micro-channels (547, 548); and an alignment slot (545) in the central wall. In other particular embodiments of the assembly (590), the separator shim (550) comprises: an entry end (551) and a return end (542); a central slot (557) at the return end; two recesses (553) at the entry end that align with the micro-channels (547, 548) of the channel shim (540); and an alignment slot (555) that aligns with the alignment slot (545) of the channel shim. One channel shim (540) may be used to form a single level between separator shims.

A single shim stack can be from about 1 inch to about 20 inches in height and from about 5 mm to about 15 mm in width. However, the dimensions of the shim stack can be varied in either direction to obtain the desired output.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 5 is an X-Z plane cross-sectional view of the fuel processor of FIG. 2 showing internal components within the casing.

FIG. 9 is a diagram of an exemplary reformer stack assembly illustrated in an assembled view (left side) and an exploded view (right side).

FIG. 11 is a side cross-sectional view and magnified view of the reformer stack assembly of FIG. 9.

FIG. 15 is a side cross-sectional view and magnified view of the vaporizer stack assembly of FIG. 13.

DETAILED DESCRIPTION

Figure 1:
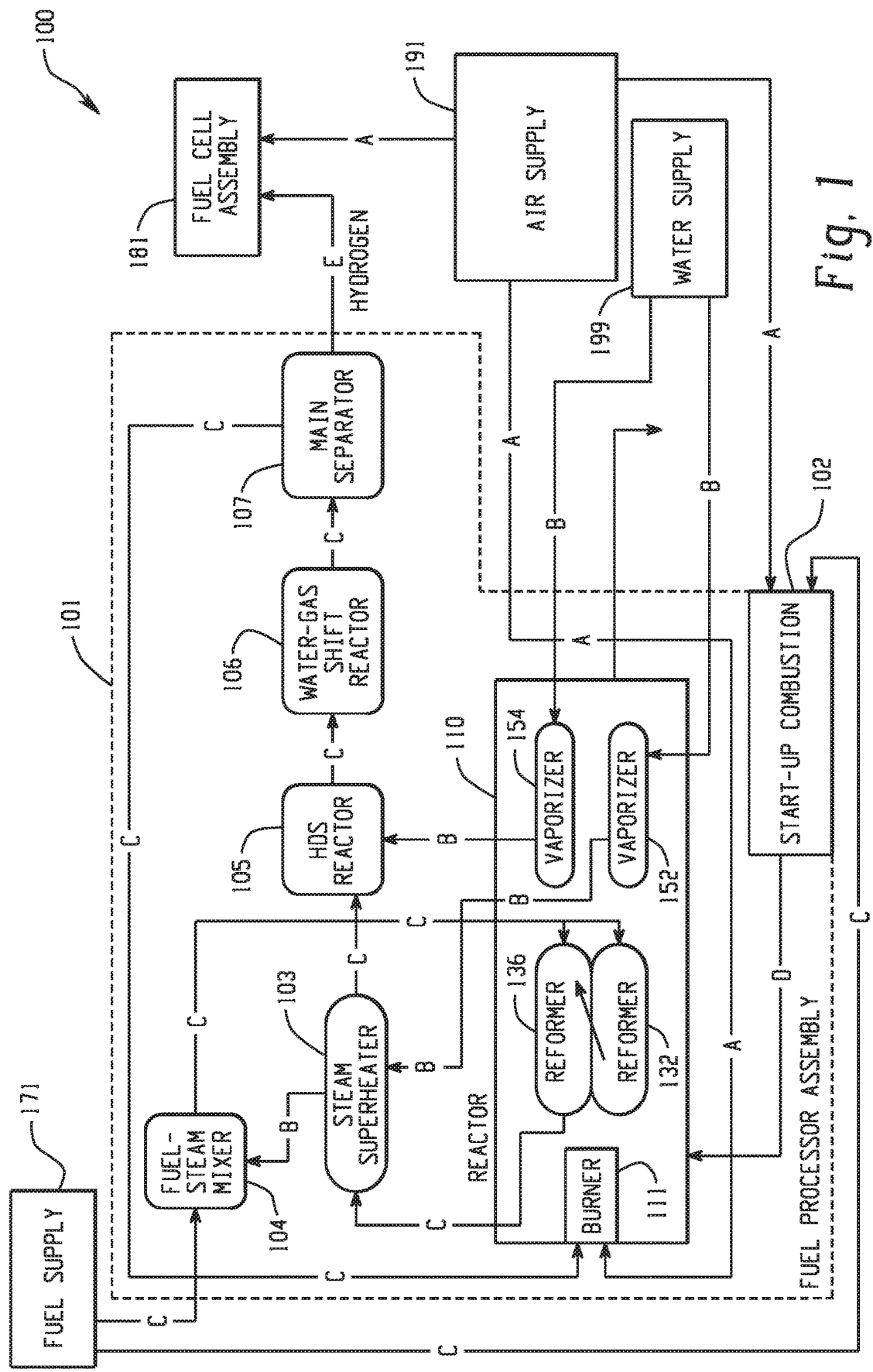
FIG. 1 is a diagram of a steam/hydrocarbon fuel reformation system that incorporates a proton exchange membrane fuel cell (PEMFC).

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

It should be noted that many of the terms used herein are relative terms. For example, the terms "interior" and "exterior", or "central" and "end", are relative to a center, and should not be construed as requiring a particular orientation or location of the structure. Similarly, the terms "upper" and "lower", "top" and "bottom", or "above" and "below" are relative to each other in orientation, i.e. an upper component is located at a higher elevation than a lower component in a given orientation, though the orientation can be changed (e.g. by flipping the components 180 degrees). The terms "inlet" and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow fluids through an upstream component prior to flowing through the downstream component.

The terms "horizontal" and "vertical" are also used to indicate direction relative to each other, and are not measured against an absolute reference. The term "horizontal" refers to a plane defined by a longitudinal axis and a transverse axis, and the term "vertical" refers to a lateral axis extending out of the "horizontal" plane. However, these terms should not be construed to require structures to be absolutely parallel or absolutely perpendicular to each other. For example, a first vertical structure and a second vertical structure are not necessarily parallel to each other. The term "orthogonal" is used to refer to two axes that are perpendicular to each other.

The present disclosure relates broadly to a heat exchanger. The heat exchanger can be used in a reactor which can be applied to fuel reforming applications, or to any set of reactions where one reaction is highly exothermic and another reaction is highly endothermic, or where one reaction is either significantly endothermic or exothermic and heat needs to be transferred to/from the reaction. The heat exchanger is also particularly useful when the primary reaction is carried out at a pressure significantly higher than the secondary reaction. The heat exchange can be operated using co-current flow (co-flow) or counter-current flow (counter-flow).

Figure 22:
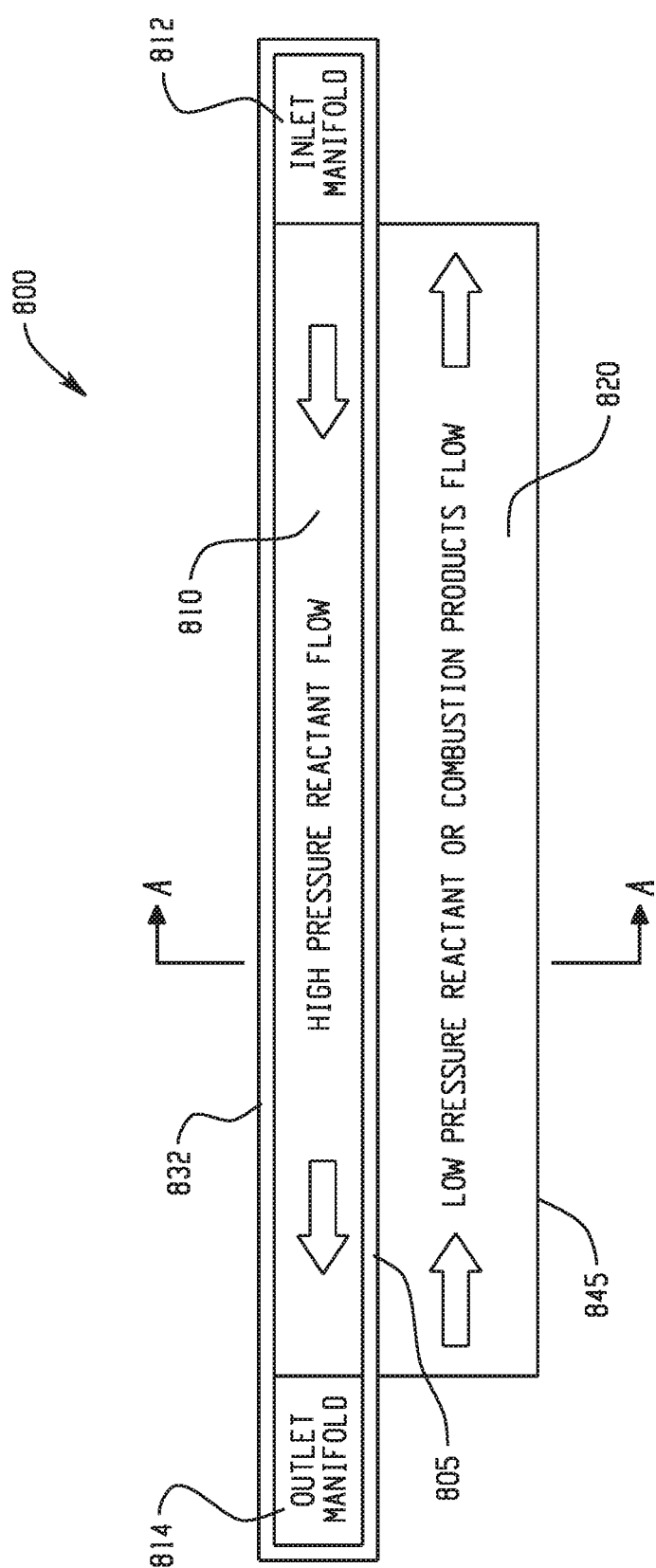
FIG. 22 is a conceptual diagram of a heat exchange assembly of the present disclosure.
Figure 23:
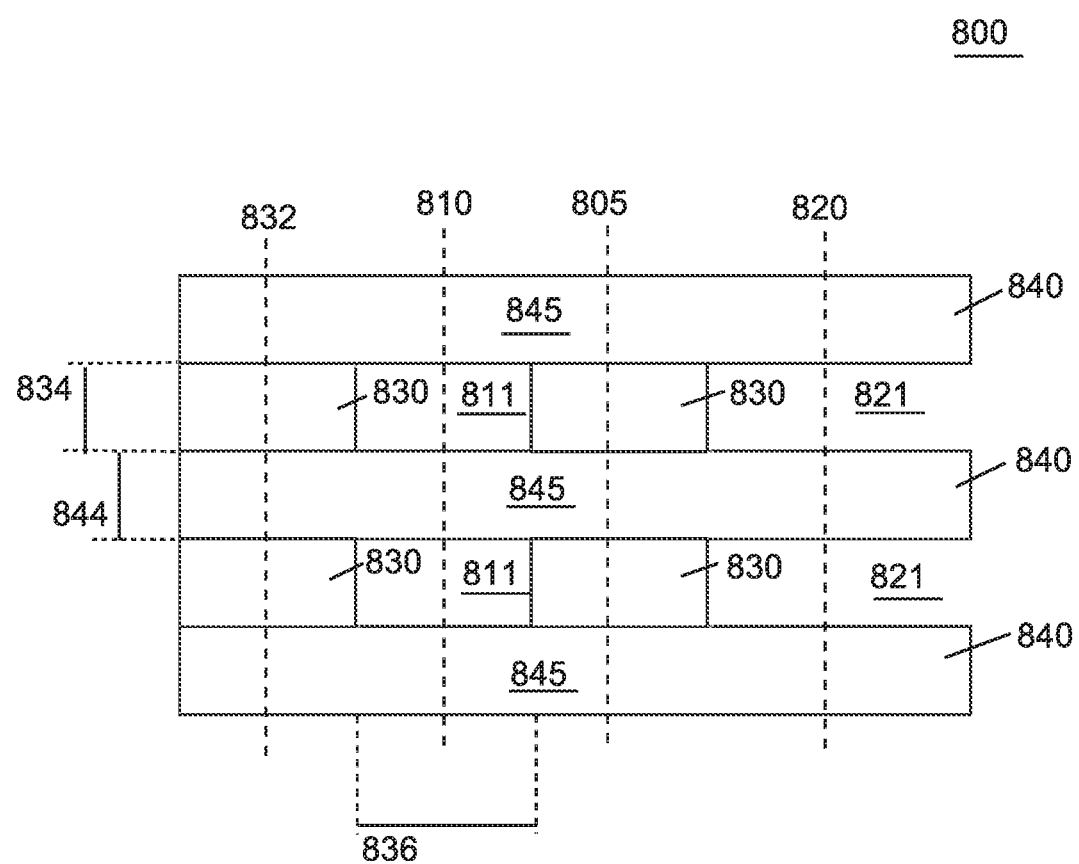
FIG. 23 is a cross-sectional view of the heat exchange assembly taken along line A-A of FIG. 22.

The heat exchanger design is broadly illustrated in the plan view of FIG. 22 and the cross-sectional view of FIG. 23 (taken along line A-A of FIG. 22). The heat exchanger 800 includes two channels, a first channel 810 and a second channel 820. Each channel has a height, length, and width. The first channel 810 and second channel 820 are separated by a first wall 805. The two channels are defined by two shims having different shapes, a channel shim 830 and a separator shim 840. The channel shim provides a second wall 832 opposite the first wall. The separator shim provides a fin 845 that extends from the second channel into the first channel, and passes through the first wall 805 and extends to the second wall 832, and acts as a heat transfer surface. The heat transfer surface is present in both the first channel and the second channel.

The channel shim 830 and the separator shim 840 cooperate to form the first wall 805 that separates the first channel 810 from the second channel 820. The first channel includes a horizontal flowpath, as does the second channel. In addition, an inlet manifold 812 is present at one end of the first channel, and an outlet manifold 814 is present at a second opposite end of the first channel. These manifolds extend orthogonally to the horizontal flowpath (i.e. vertically), and permit access to the first channel.

As seen in the cross-sectional view of FIG. 23, each channel 810, 820 includes a plurality of micro-channels 811, 821. The separator shim 840 may be considered as providing a fin 845, and the interleaving fins 845 and passages 811, 821 allow for high heat transfer from one channel to the other channel. The micro-channels may be thought of as vertical layers that are combined to form the channel.

Generally, the channel shim defines the height of the micro-channels in the two channels. The channel shim has a height 834. The channel shim also has a width 836, which is measured between the two walls. The separator shim (i.e. fin) has a height 844. The ratio of the channel shim width 836 to the channel shim height 834 may be from 2:1 to 20:1. The ratio of the channel shim height 834 to the fin height 844 may be from 0.125 to 8 (i.e. 0.125:1 to 8:1), or from 0.25 to 4 (i.e. 0.25:1 to 4:1), or in more specific embodiments from 0.5 to 2. In this regard, thick fins (i.e. a ratio of 1 or lower) may be needed to enable effective heat transfer for high temperature reactions, because materials that can withstand high temperatures typically have low thermal conductivity values.

The interleaved fins 845 and passages 811, 821 allow a compact design that can operate at high pressure because the fins provide support for the walls 805, 832 of the channels. This is different than the usual construction for a heat exchanger, where fins are only attached to a wall at one end (i.e. extend from a wall, with the other end hanging freely). Here, extending the fins 845 across the entire channel (i.e. from first wall 805 to second wall 832) provides a strength benefit as well as a heat exchange benefit. Additionally, adjusting the channel shim height 834 and the thickness of the walls 805, 832 enables a differential pressure between 1 and 50,000 PSI to be accommodated between the primary and secondary reaction occurring within the heat exchanger 800.

The present disclosure also relates to heat exchangers that can be used as a fuel processor that accepts as inputs a hydrocarbon fuel and steam, and produces as outputs carbon monoxide and hydrogen gas. Generally, the fuel processor comprises a housing or casing in which a reformer assembly and a vaporizer assembly are located. Hot combustion gases flow from one end of the casing to the other end. The vaporizer assembly converts water to steam. The steam is combined with the hydrocarbon fuel and then travels through the reformer assembly to be converted into carbon monoxide and hydrogen gas. The water in the vaporizer assembly, and the fuel/steam mixture in the reformer assembly can flow counter-current (180 degrees in the opposite direction) to the flow of the hot combustion gas. The reformer assembly and the vaporizer assembly each act as heat exchangers to facilitate the reactions needed for fuel processing. Alternatively, the water and the fuel/steam mixture can flow co-current to the hot combustion gas.

The reformer assembly and the vaporizer assembly are formed by alternating two different shim structures (i.e. a channel shim and a separator shim) to form each assembly, and then joining the shims together. Previous shims have included fine-detailed geometry that limit fabrication options. Shim geometry is further complicated by in-channel catalyst stand-offs, and chemical etching processes are the only way to make some features of current shims. Many pieces must be assembled individually into the combustion duct of current fuel processors, and these pieces often occupy too large of a volume in order to achieve hot gas uniformity and between-panel spacing, making the reactor too large. Additionally, prior shims have long lengths of metal; when exposed to heat, such shims are heated to different temperatures along their length, which show a potential for thermal expansion stress of the shim and subsequent failure of the reactor. The present disclosure reduces such problems.

FIG. 1 is a diagram of a steam/hydrocarbon fuel reformation system that incorporates a proton exchange membrane fuel cell (PEMFC). The system 100 includes a fuel processor assembly 101, a fuel supply 171, a fuel cell assembly 181, an air supply 191, and a water supply 199. The fuel processor assembly 101 includes a reactor 110 that operates as a fuel processor herein. This figure includes flow of four different fluids: air (marked A); water/steam (marked B); fuel or reformate (marked C); and combustion gas (marked D).

The system 100 begins with the fuel processor assembly 101 receiving fuel from fuel supply 171 and receiving air from air supply 191, which are fed directly to the start-up combustor 102. The fuel supply 171 can be JP8 low sulfur content fuel (approximately 125 ppm sulfur), more preferably sulfur-free JP8, or generally any other combustible hydrocarbon. Initially, the fuel processor assembly is at roughly room temperature. However, the steam/hydrocarbon reformation reaction requires a temperature of about 300° C. when using fuels such as methanol and between 300° C. and 850° C. when using fuels such as natural gas before the overall system becomes self-sustaining. Thus, the start-up combustor burns fuel to heat up the fuel processor 110 for the subsequent steam-hydrocarbon fuel reformation reaction.

The start-up combustor 102 is also used to initially provide hot combustion gas through the fuel processor 110. As the overall reformation reaction continues, air from the air supply 191 and scrap reformate from main separator 107 are supplied to a burner 111 in fuel processor 110. Scrap reformate gas includes mostly carbon monoxide gas, methane ($CH_4$) gas, and residual hydrogen gas. The burner 111 ignites the scrap reformate to provide hot combustion gas within the fuel processor 110. Once the combustion reaction within burner 111 is self-sustainable, the start-up combustor 102 is no longer needed.

Continuing at the bottom left of FIG. 1, hot combustion gas traveling through the fuel processor 110 heats up the vaporizer sections 152, 154. These vaporizer sections receive water from water supply 199, which is heated to become hot steam. This hot steam can optionally be sent to steam superheater 103 for additional heating before traveling to a fuel-steam mixer 104. Alternatively, the steam from vaporizers 152, 154 can travel directly to the fuel-steam mixer 104 without being superheated. Steam may also be sent to the hydrodesulfurization (HDS) reactor 105 to preheat the HDS reactor 105 for HDS reactions to occur and to assist with the separation of hydrogen from reformate. Please note that although only one arrow is drawn from vaporizer section 152 to steam superheater 103, the steam from vaporizer section 154 can also be sent to steam superheater 103. Similarly, the steam from vaporizer section 152 can also be sent to HDS reactor 105. It should be noted that the HDS reactor 105 is optional, and is not needed if the presence of sulfur is acceptable.

At the fuel-steam mixer 104, steam is mixed with fuel from the fuel supply 171 to form reformate. The reformate is sent to reformer sections 132, 136 where the steam and fuel react with each other under high temperature, in the presence of catalyst, to produce hydrogen gas (H$_2$) and carbon monoxide (CO) according to the classical steam reformation reaction in EQN. 1:

$$CH_4 + H_2O(g) \rightarrow 3H_2(g) + CO(g) \qquad \text{(EQN. 1)}$$

The output of the reformer sections 132, 136 may include the products of the reformation reaction (H$_2$(g) and CO(g)), as well as residual methane (CH$_4$(g)), carbon dioxide (CO$_2$ (g)), and steam (H$_2$O(g)). The output of reformer sections 132, 136 optionally can be sent through the steam superheater 103 to participate in a heat exchange reaction with the steam that will be used to make new reformate. The output may then optionally go to a hydrodesulfurization (HDS) reactor 105. At the HDS reactor 105, a portion of the gaseous reformer output may be combined with raw fuel which contains sulfur. With the appropriate catalyst and processing conditions, the raw fuel is desulfurized for use later. Alternatively, a portion of the hydrogen may be extracted from the reformate to assist with the desulfurization reaction. For the PEM system of FIG. 1, the reformer output also passes through at least one of a water-gas shift (WGS) reactor 106 or main separator 107. The separator in FIG. 1 separates hydrogen from the reformate which is directed to the fuel cell assembly 181. The remaining components and any hydrogen not removed from the reformate by the separator are directed to the burner to provide the heat needed for the steam reforming reaction. The purpose of the shift reactor 106 is to increase the hydrogen content of the reformate via a well known shift reaction:

$$CO + H_2O \rightarrow CO_2 + H_2$$

At the main separator 107, hydrogen gas (H$_2$) is separated from the reformer output and routed to the fuel cell 181. The main separator 107 routes the other components, including CO not converted by the WGS reactor, methane (CH$_4$) gas, and residual hydrogen gas not used by the fuel cell assembly 181, back to the burner 111 as scrap reformate fuel for another steam/fuel reformation reaction cycle.

In FIG. 1, the fuel cell assembly 181 includes a proton exchange membrane fuel cell (PEMFC) which allows the system 100 to produce approximately a 6 kW to 8 kW net output of electricity. The amount of electricity produced by the system 100 may be increased with more PEMFCs which can be fed with hydrogen gas input produced by the fuel processor assembly 101. As needed, additional reformer sections can be added to the fuel processor 110. Alternatively, the reformer sections 132, 136 can be increased in dimension to produce additional hydrogen gas.

The chemical reaction occurring at the fuel cell assembly 181 when including a PEMFC is represented by EQN. 2:

Anode: $2H_2(g) \rightarrow 4H^+ + 4e^-$

Cathode: $O_2 + 4H^+ + 4e^- \rightarrow 2H_2(l) + \text{heat} + \text{oxygen depleted air}$ \qquad (EQN. 2)

Hydrogen gas provided from the main separator 107 enters a gas diffusion anode of the PEMFC assembly 181 where it is electrolyzed into protons and electrons in the presence of metal catalyst, e.g., platinum. Protons produced at the anode travel across a proton exchange membrane to a gas diffusion cathode, thereby "exchanging" protons from the anode to the cathode. Air from air supply 191 is provided to the cathode of the PEMFC assembly 181, which combines with protons to form water and heat. Electrons produced at the anode travel to the cathode through an electron bridge, the flow of electrons creating an electrical current. In one embodiment, fuel processor 110 is used to produce approximately 6 kW of net output electricity within system 100 when fuel cell assembly 181 includes a PEMFC.

Figure 2:
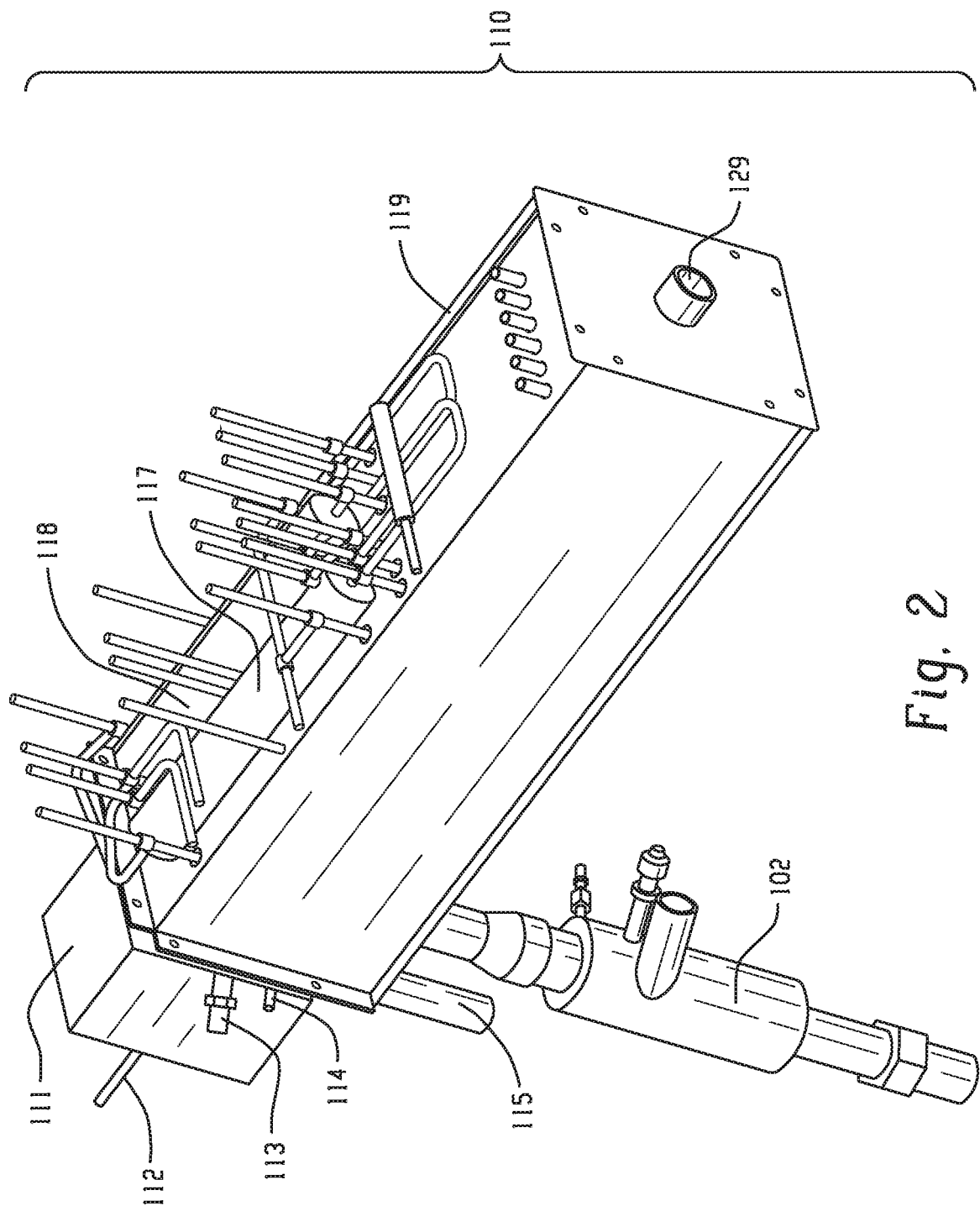
FIG. 2 is a three-dimensional (3D) model of a first exemplary embodiment of a fuel processor of the present disclosure showing an external perspective view. In this embodiment, the channels in the reformer and vaporizer are arranged linearly.
Figure 3:
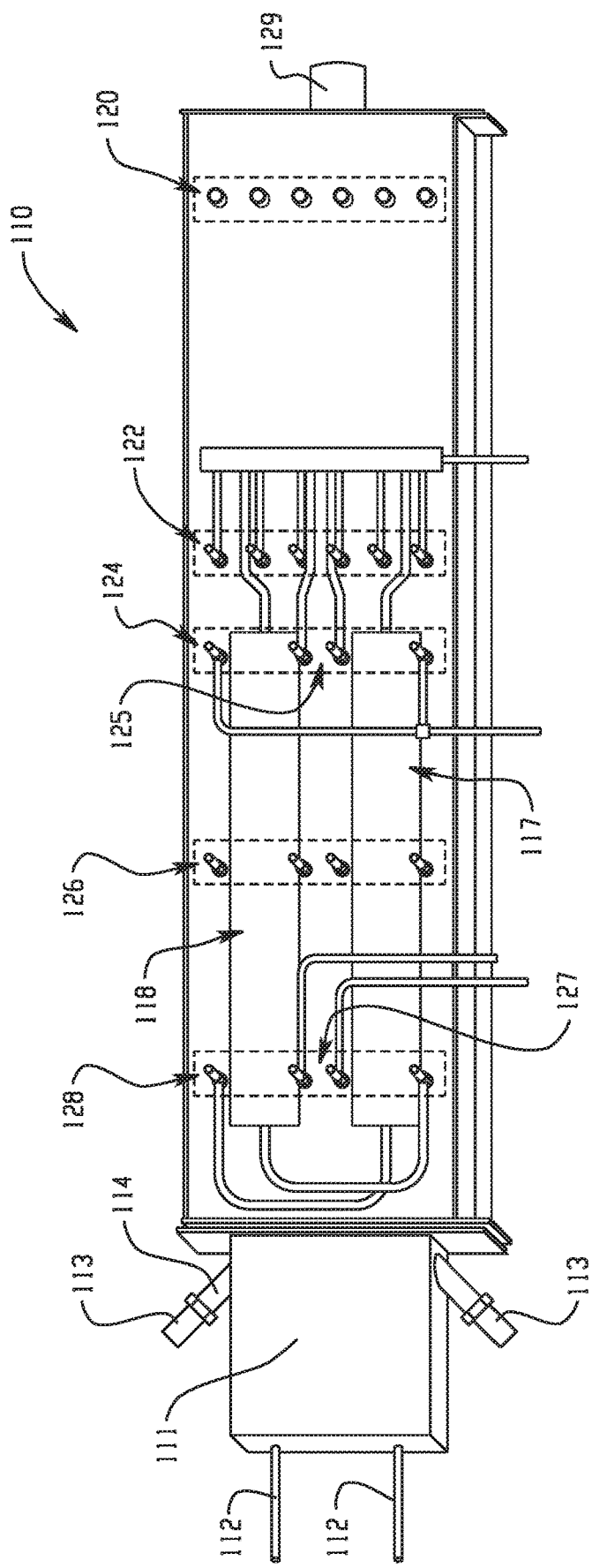
FIG. 3 is a plan view of the exterior of the fuel processor of FIG. 2 (looking along the Y-axis).
Figure 4:
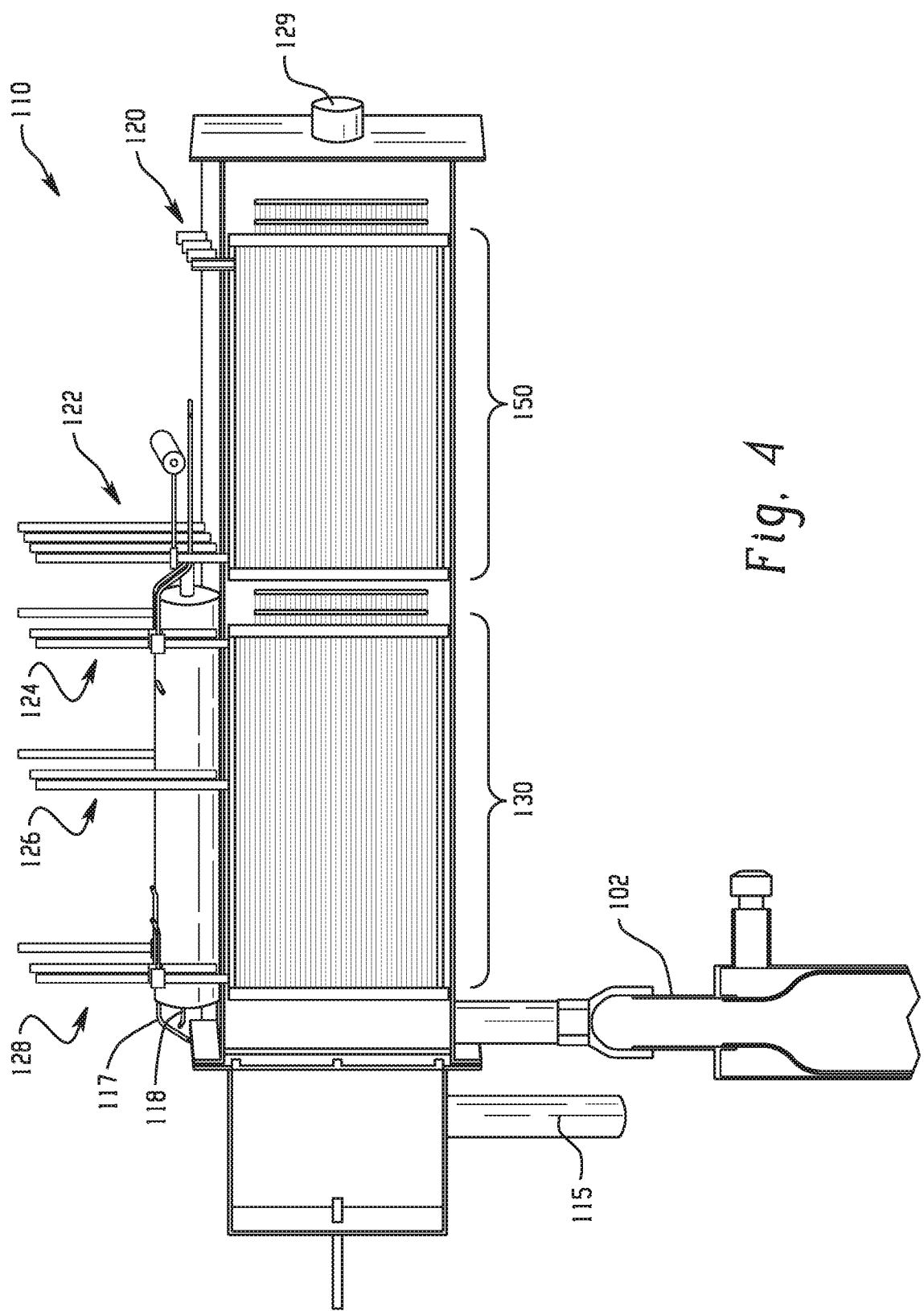
FIG. 4 is an X-Y plane cross-sectional view of the fuel processor of FIG. 2.

FIGS. 2-5 are different views of a first exemplary embodiment of a fuel processor. FIG. 2 is an external perspective view. FIG. 3 is an external plan view of the top of the fuel processor. FIG. 4 is a side cross-sectional view. FIG. 5 is a perspective cross-sectional view.

Referring now to FIG. 1 and FIG. 2 together, the fuel processor 110 includes the burner 111 and optionally two adiabatic reformers 117, 118 which are disposed upon the top of the casing 119. The burner 111 may include one or more gas inlets 112 for receiving the scrap reformate fuel from the main separator 107. The burner 111 may further include one or more igniters 113, thermocouple tubes 114, and air inlets 115 (which supply air from air supply 191). The start-up combustor 102 is shown as being integrally attached to the bottom of the casing, though this location can be changed as desired. The burner is located at one end of the casing. Combustion gas provided by either the startup combustor 102 or combustion of scrap reformate fuel input by the burner 111 flows through the casing 119 and exits at an exhaust port 129 located at the end of the casing opposite the burner. The casing 119 may be made from any suitable casing material, including any suitable metal known to one having ordinary skill in the art.

Referring to FIG. 3, vaporizer inlets 120 are shown here as being located at the end of the casing 119 adjacent the exhaust port 129. Vaporizer outlets 122 are located closer to the center of the casing 119. Reformer inlets 124 are also located near the center of the casing. As shown here, there are a total of four reformer inlets, with two of them being considered inner reformer inlets 125. Reformer outlets 128 are located at the end of the casing 119 adjacent the burner 111. As shown here, there are a total of four reformer outlets, with two of them being considered inner reformer outlets 127. Sample outlets 126 are also provided between the reformer inlets 125 and the reformer outlets 128. The two adiabatic reformers 117, 118 are also visible.

Referring now to FIG. 1 and FIG. 3 together, water from the water supply 199 enters the vaporizer 152/154 at vaporizer inlets 120. The water is heated by hot combustion gases within fuel processor 110, and exits the vaporizer outlets 122 as steam. This steam can be sent to steam superheater 103, fuel-steam mixer 104, or HDS reactor 105 as previously described. The reformate produced at the fuel-steam mixer 104 enters the reformer 132, 136 through reformer inlets 124. The reformate will travel through one of the reformer sections from an inlet 124 to the reformer outlet 128 while being heated by surrounding combustion gases within fuel processor 110. A majority of the reformate is converted to products H$_2$ (g) and CO (g) according to EQN. 1 by the time the reformate reaches reformer outlets 128. Experimental samples may be taken through sample outlets 126 to access the progress of the reformation reaction. The output from reformer outlet 128 may then be directed to an adiabatic reformer 117, 118 which provides additional reaction time at high temperature to continue the reforming reaction. The use of adiabatic reactor(s) as shown is considered as an optional cost reduction measure applicable to some configurations. The reformate and/or reformation products subsequently travels back to another reformer inlet (here, inner reformer inlet 125) and then travels again through the interior of the casing 119 for another reformation reaction cycle. In the second cycle, the reformate exits from inner reformate outlets 127. The reformation products then travel to either the optional steam superheater 103 or the HDS reactor 105.

Referring now to FIG. 4, the fuel processor 110 includes the burner 111 at one end and the exhaust port 129 at the opposite end of the casing. Located adjacent the burner is the reformer stack assembly 130. As explained further herein, the reformer stack assembly is comprised of stacked metal shims which are bonded together by, for example, diffusion bonding. The reformer outlets 128, sample outlets 126, and reformer inlets 124 travel down the vertical height (y-axis) of the reformer stack assembly 130. The fuel processor 110 also includes a vaporizer stack assembly 150 which, similar to the reformer stack assembly 130, is comprised of stacked metal shims which are diffusion bonded together. Vaporizer outlets 122 and vaporizer inlets 120 travel down the vertical height (y-axis) of the vaporizer stack assembly 150.

The perspective view of FIG. 5 through fuel processor 110 shows the reactor sections 132, 136 and vaporizer sections 152, 154 within reformer stack assembly 130 and vaporizer stack assembly 150, respectively (see FIG. 1).

Referring now to FIG. 1, FIG. 3, and FIG. 5 together, counter-current flow (i.e. counter-flow) of the reactant gases and combustion gases within fuel processor 110 can be visualized. The reformer stack assembly 130 of FIG. 5 includes the reformer sections 132, 136 of FIG. 1. Reformer section 132 (FIG. 1) includes a reformer combustion channel 133 surrounded on two sides by an outer reaction channel 134 and an inner reaction channel 135 (FIG. 5) along the width of the processor. Similarly, reformer section 136 includes a reformer combustion channel 137 surrounded on two sides horizontal passageway by an outer reaction channel 138 and an inner reaction channel 139.

Referring to FIG. 5, the reaction channels 134, 135, 138, 139 are accessed by orthogonal passageways at either end of the channels. Put another way, fluid flows through each reaction channel through the vertical passageways and a horizontal flowpath between the two vertical passageways, in a U-shape. Fluid will flow through each combustion channel 133, 137 in a straight line from one end to the other, i.e. through only a horizontal passageway. Again, these orientations are relative, not absolute. The reaction channel and the combustion channel can also be described as having parallel flowpaths, with the reaction channel also including orthogonal passageways for accessing the flowpath.

In use, reformate will enter the outer reaction channel 134 of reformer section 132 at reformer inlet 124 and, in a first cycle, travel to reformer outlet 128. As seen in FIG. 3, the reformate from outlet 128 will then travel through adiabatic reformer 117 and then enter reformer section 136 through inner reformer inlet 125. In a second cycle, the reformate then travels through inner reaction channel 139 towards inner reformer outlet 127. Concurrently, hot combustion gas originates from either start-up combustor 102 or burner 111 and travels through reformer combustion channels 133, 137 towards exhaust port 129. The combustion gas travels in the direction from burner 111 to exhaust port 129. The reactant gases travel in the direction from exhaust port 129 towards burner 111, i.e. 180 degrees different from the combustion gas. The two flow paths are parallel to each other, but in opposite directions, i.e. counter-current flow. Of course, the fuel processor could be operated in co-current flow by reversing the locations of the burner 111 and the exhaust port 129, and maintaining the direction of flow in the reaction channels.

FIG. 5 reveals additional details of the burner 111. Burners 116 are located adjacent reformer sections 132, 136. Burners 116 combust scrap reformate coming from gas inlets 112, and the hot combustion gas flows through the combustion reactor channels 133, 137 and through fuel processor 110 towards exhaust port 129. Other burners known to one having ordinary skill in the art may be used in this position if they provide appropriate flame geometry.

The concept of counter-current flow also applies to the vaporizer. The vaporizer stack assembly 150 of FIG. 5 includes the vaporizer sections 152, 154 of FIG. 1. The vaporizer stack assembly includes an alternating series of vaporizer water channels 151 and vaporizer combustion channels 153 across its width. The channels 151, 153 of the vaporizer stack assembly are along the same axis as the channels 133, 134, 135, 137, 138, 139 of the reformer stack assembly, or put another way the channels are parallel. Water enters the vaporizer water channel 151 through vaporizer inlet 120 and travels to vaporizer outlet 122. Combustion gas traveling through vaporizer combustion channels 153 will transform the water to water/steam mixture or steam.

Reaction channels 134, 135, 138, 139 differ from vaporizer water channels 151 in the presence of catalyst 131. The catalyst 131 catalyzes the highly endothermic reformation reaction in EQN. 1. The catalyst 131 is preferably a highly active precious metal catalyst known to one having ordinary skill in the art. For example, the catalyst may be a spinel catalyst. The catalyst 131 may be coated on a corrugated material which is inserted into reaction channels 134, 135, 138, 139. The catalyst 131 can also be coated on a flat rectangular material that is inserted into the reaction channels 134, 135, 138, 139 on either side of the catalyst-coated corrugated material to provide a flow passage completely surrounded by catalyst. Alternatively, the catalyst 131 is directly coated onto walls of reaction channels 134, 135, 138, 138 to provide equivalent configuration in combination with the catalyst-coated corrugated material. Catalyst-coated corrugated materials may be preferable due to open flow passages yielding low pressure drop and good catalyst contacts. Alternate catalyst support materials such as metal foam or a metal screen may be beneficial. The metal screen may be corrugated, or the metal foam may be a simple insert.

The reaction channels 134, 135, 138, 139 also differ from vaporizer water channels 151 in the presence of a mixing manifold 140 within each channel 134, 135, 138, 139 (shown here at the center of the channel). The mixing manifold 140 provides some mixing between the various micro-channels/levels/layers within each channel. The mixing manifold also provides an entry point for samples to be extracted through sample outlets 126 (see FIG. 3) to assess reformation reaction progress if desired. Additionally, the catalyst 131 may be placed into the mixing manifold along a retainer. Some vertical mixing may also occur. However, it should be noted that the presence of the mixing manifold 140 is not necessary.

Figure 6:
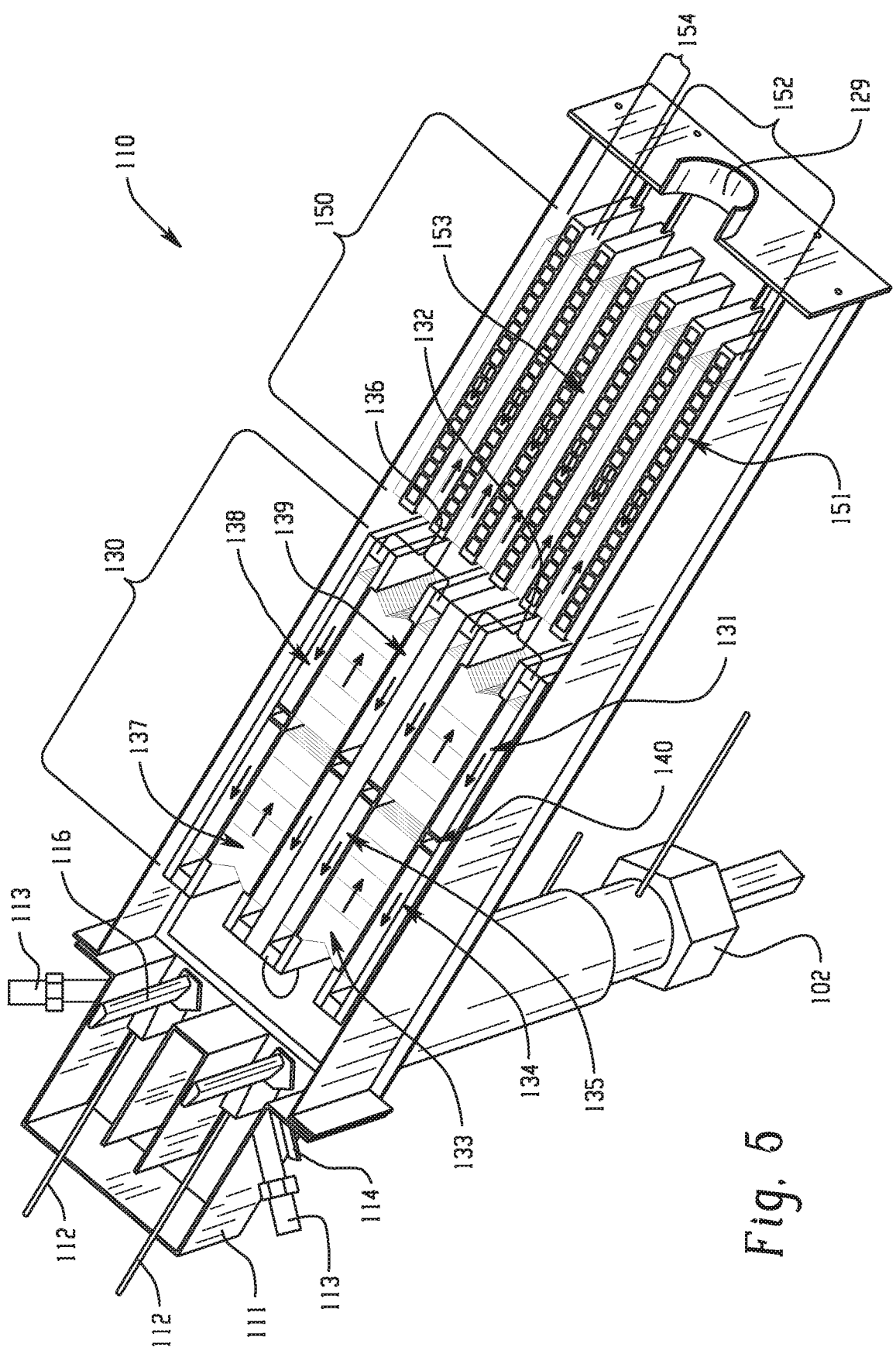
FIG. 6 is a diagram of a steam/hydrocarbon fuel reformation system that incorporates a solid oxide fuel cell (SOFC).
Figure 6:
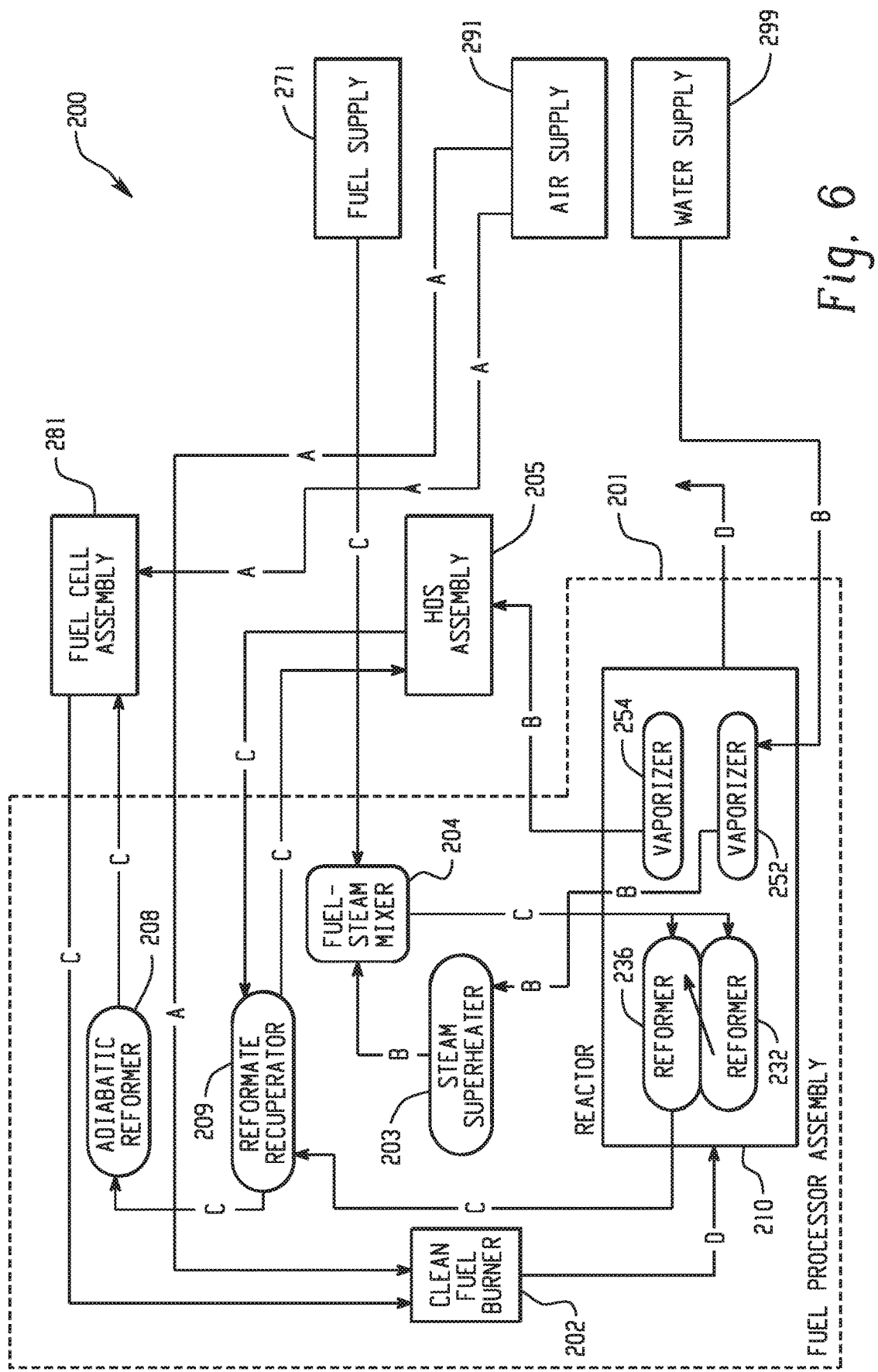

FIG. 6 is a diagram of a steam/hydrocarbon fuel reformation system that incorporates a solid oxide fuel cell (SOFC). The fuel processor assembly 201 includes a reactor 210 that operates as a fuel processor herein. This figure includes flow of five different fluids: air (marked A); water/steam (marked B); fuel or reformate (marked C); combustion gas (marked D); and hydrogen (marked E).

The system 200 includes a fuel processor assembly 201, a fuel supply 271, a fuel cell assembly 281, an air supply 291, and a water supply 299. The system 200 begins with the clean fuel burner 202 receiving fuel, which may be from a separate burner, or the fuel supply 271 (not shown). Hot combustion gas travels from clean fuel burner 202 to fuel processor 210, where the combustion gas flows through the fuel processor 210. Water from water supply 299 enters vaporizer sections 252, 254 and is heated to steam by the hot combustion gas flowing counter-current to the water flow. The steam optionally travels to a steam superheater 203 for further heating before traveling to a fuel-steam mixer 204.

At fuel-steam mixer 204, the steam is mixed with fuel supplied by fuel supply 271. The steam/fuel mixture enters reformer sections 232, 236. The steam/fuel mixture reacts under high temperature in the presence of a catalyst (not shown) to produce hydrogen gas ($H_2$) and carbon monoxide (CO) according to the classical steam reformation reaction in EQN. 1.

The output of the reformer sections 232, 236 includes the products of the reformation reaction ($H_2(g)$ and $CO(g)$), as well as residual methane ($CH_4(g)$), carbon dioxide ($CO_2(g)$), and steam ($H_2O(g)$). The output of reformer sections 232, 236 optionally travels to the reformate recuperator 209 and then to the HDS assembly 205 where the reformate is cooled and some hydrogen is extracted while at pressure. The reformate then flows back to the reformate recuperator 209 and is reheated. The reheated, now low pressure reformate can then pass through the adiabatic reformer 208 to react more of the methane into hydrogen and CO (greater methane reforming is possible at lower pressure) before entering the fuel cell assembly 281.

The fuel cell assembly 281 includes a solid oxide fuel cell (SOFC) which allows system 200 to produce approximately 2 kW to 4 kW net output of electricity, though the system can be scaled to produce between 1 kW and several megawatts of electricity. The amount of electricity produced by system 200 may be increased with more SOFCs which can be fed with a hydrogen gas or reformate input. Again, more hydrogen can be produced by adding more reformer sections or by increasing the dimensions of the existing reformer sections.

The chemical reaction occurring at the fuel cell assembly 281 when including a SOFC is represented by EQN. 3:

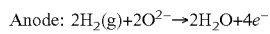

Anode: $2H_2(g) + 2O^{2-} \rightarrow 2H_2O + 4e^-$

Cathode: $O_2(g) + 4e^- \rightarrow 2O^{2-}$  (EQN. 3)

Air from air supply 291 is provided to a cathode of the SOFC assembly 281, where it breaks up to produce oxygen ions. The oxygen ions pass through a solid ceramic electrolyte to get to an anode. Hydrogen gas or reformate provided from the adiabatic reformer 208 then enters the anode of the SOFC assembly 281 and breaks apart into ions. Hydrogen ions at the anode combine with oxygen ions traveling from the cathode to produce water. The water and any excess fuel leave the anode and are sent to the clean fuel burner 202 for combustion (in the presence of air from air supply 291), restarting the fuel cycle. Splitting apart the hydrogen atoms at the anode produces electrons and electrical current. The electrons are routed back to the cathode through a bridge and are consumed when oxygen is split into ions at the cathode. In embodiments, fuel processor 210 can produce 2 kW of net output electricity within system 200 when fuel cell assembly 218 includes a SOFC.

Figure 7:
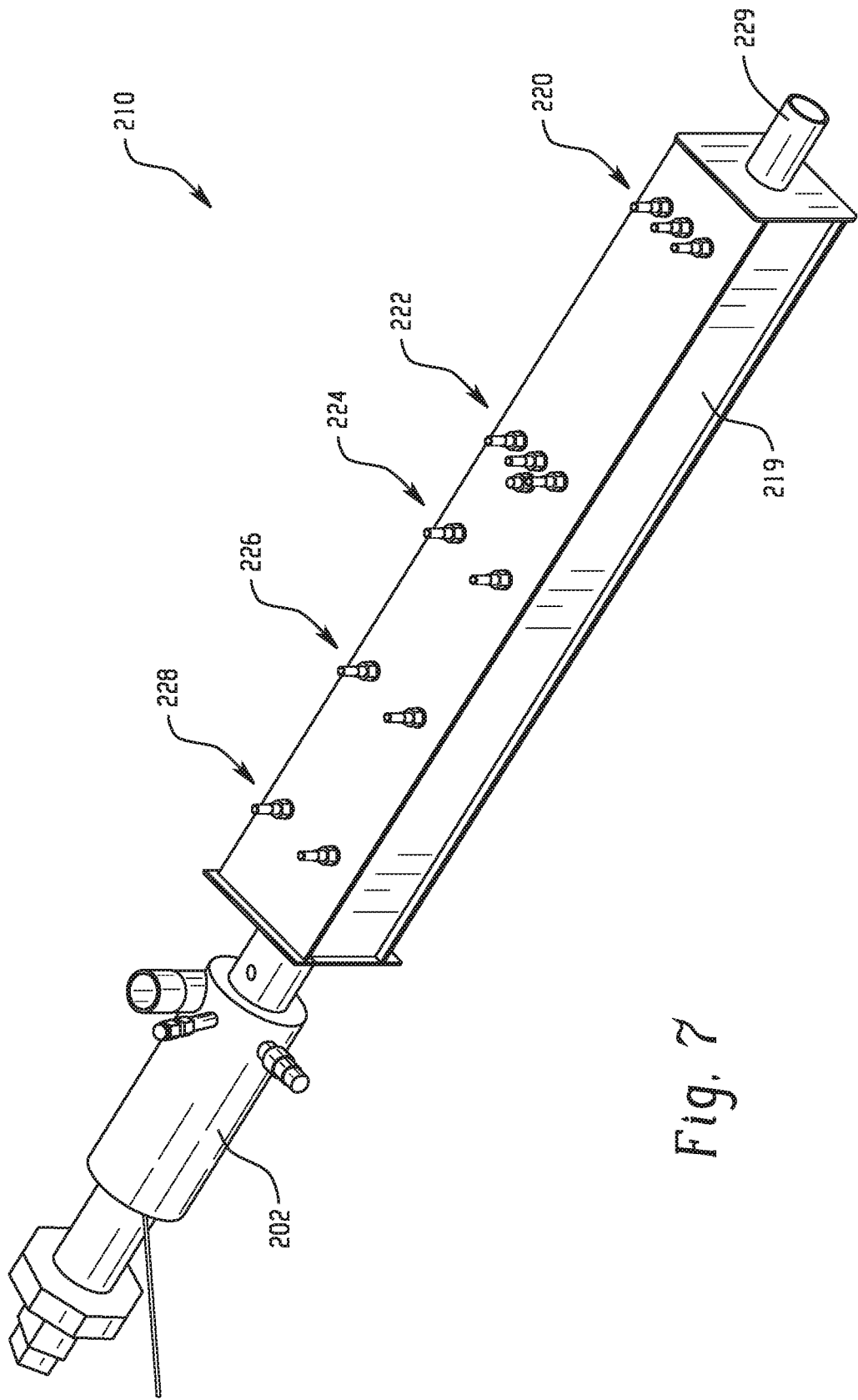
FIG. 7 is an external perspective view of a second exemplary embodiment of a fuel processor of the present disclosure. In this embodiment, the channels in the reformer and vaporizer are arranged linearly.
Figure 8:
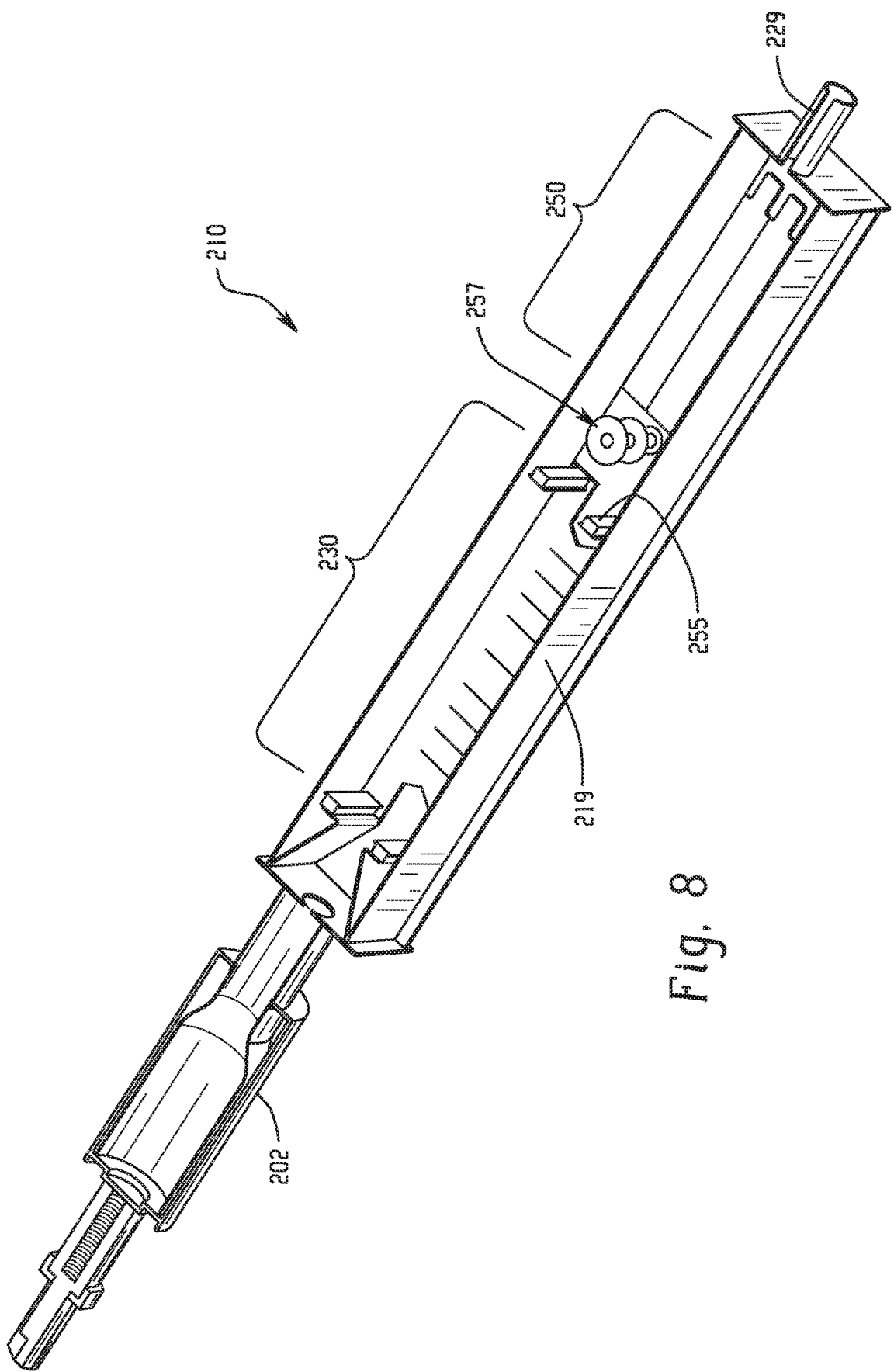
FIG. 8 is an X-Z plane cross-sectional view of the fuel processor of FIG. 7. Only a single layer of the reformer stack assembly and the vaporizer stack assembly are shown.

FIG. 7 and FIG. 8 are different views of a second exemplary embodiment of a fuel processor. FIG. 7 is an external perspective view. FIG. 8 is an internal view through the X-Z plane.

Referring to FIG. 7, the fuel processor 210 can be attached to a fuel burner 202 that provides hot combustion gas, without a separate burner or start-up combustor (see reference numerals 111, 102 in FIG. 2). Fuel processor 210 includes a casing 219 upon which are disposed reformer outlets 228, sample outlets 226, reformer inlets 224, vaporizer outlets 222, and vaporizer inlets 220. The casing 219 further includes an exhaust port 229 opposite the fuel burner 202. As seen by the number of inlets and outlets, this casing would hold two reformer sections and three vaporizer sections.

Referring to FIG. 8, the interior of fuel processor 210 is visible and shows locations for a reformer stack assembly 230 and a vaporizer stack assembly 250. These sections are smaller in this embodiment compared to that seen in FIG. 5. Tabs 255 are present for use when placing the reformer stack assembly 230 into the casing 219, to fix the assembly in place. The casing 219 here is shown as being made in two pieces, and a bolt/washer/nut assembly 257 is used to secure the two pieces together. In other embodiments, the casing 219 is made from four pieces. Other securing arrangements can also be used.

FIG. 9 shows a heat exchanger/reformer stack assembly 330 illustrated in an assembled view (left side) and an exploded view (right side). The reformer stack assembly 330 provides the reformate reaction channels and reformate combustion channels. The reformer stack assembly 330 may be fabricated by diffusion bonding an alternating stack of shims 340 of appropriate design. Each shim 342, 344 may be manufactured by wire electrical discharge machining (EDM) in stacks of 10 to 200 at one time. Other shim manufacturing methods include water jet, laser cutting, or stamping/punching production methods.

The reformer stack assembly 330 may be assembled with the aid of alignment pins 335 used to align plates 332, 336 and shims 342, 344. The pins 335 can be removed after assembly. Care should be taken to minimize shifting of the alternating shim stack 340 during the bonding process.

As seen on the right side, the reformer stack assembly 330 is assembled by first inserting the bottom plate 336 upon the alignment pins 335. Two types of shims are used, a channel shim 344 and a separator/fin shim 342. These shims are used to form levels, with the shim in each level being alternated. As illustrated here, one channel shim 344 is placed above bottom plate 336 to form one level. Next, one separator shim 342 is placed above the channel shims to form the next level. The shims are alternated to form the shim stack 340. The top plate 332 is finally placed. The alternating stack 340 can be formed by an appropriate numbers of separator shim/fins 342, e.g. 25-54 separator shim/fins 342, and 52-110 channel shims 344 stacked between each other. The alignment pins 335 are shown here as being removed from the stack 340. This alternating pattern of shims creates the reaction channels and combustion channels seen in FIG. 5 in the reformer stack assembly, with each channel being formed of vertical layers/micro-channels through which fluid can pass. This structure can also be seen in FIG. 23.

Figure 10:
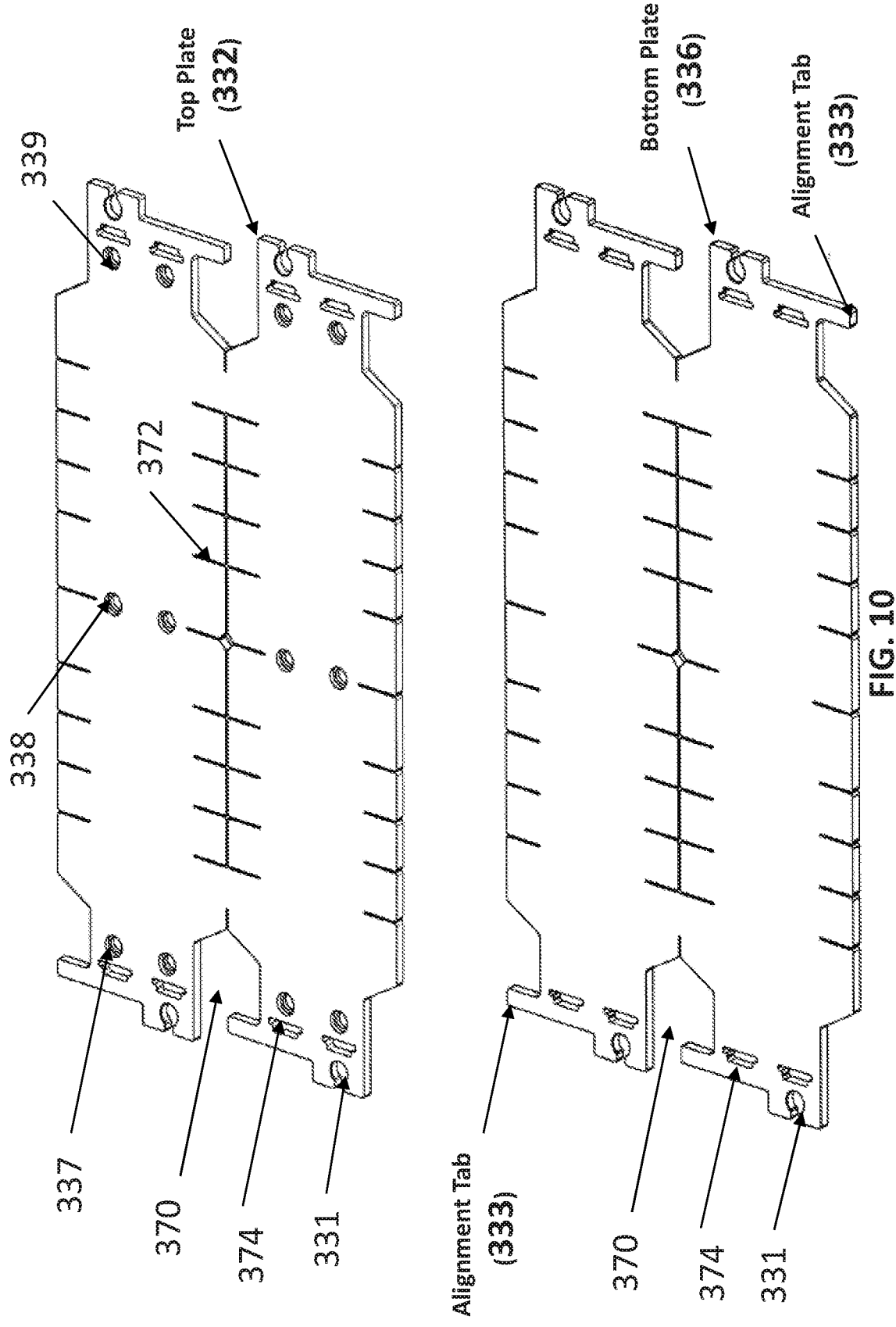
FIG. 10 is a perspective view of top and bottom plates for the reformer stack assembly of FIG. 9.

FIG. 10 is a perspective view of the top plate 332 and the bottom plate 336. Plates 332, 336 may be manufactured from 0.125 mm thick rolled annealed (RA) Inconel 625 high performance alloy or other oxidation resistant material as appropriate for the temperature of the reaction being supported. For example, if the reforming reaction is being performed on methanol, the reaction temperature of approximately 300° C. may allow the use of common stainless steel such as 316. Other reactions may require other materials such as 309 or 310 stainless steel or other various materials as are well known to one having ordinary skill in the art.

The top plate 332 and the bottom plate 336 are similar in many respects to each other and to the separator shim 342. The central portion of each plate, where the channels will be located, includes a surface. Each plate includes two alignment tabs 333 on opposite sides which can be visually inspected during bonding to ensure that all shims 342, 344 in alternating shim stack 340 are aligned properly. Each plate includes four notches 331 on opposite ends through which the alignment pins 335 are inserted. Each plate also includes two indents 370 (here having a triangular shape) on opposite ends as a visual indication of where the combustion channel will be located. Several slits 372 are made in the plate along the linear axis corresponding to the combustion channel. These slits allow for differential thermal expansion between the hotter fin material and the cooler reactor channel. The slits also limit longitudinal conduction in the fin and improve heat transfer performance.

T-slot 374 is designed to interact with the tab 255 of the casing. After the stack of shims are bonded together, the ends of the stack are machined away to reveal an open manifold on either end. With the manifold open, catalyst supports can be inserted in the reaction micro-channels. The manifold can then be closed up by sliding in the tab 255 and sealed by welding it closed.

The top plate 332 also includes features that are not present on the bottom plate 336. More particularly, the top plate includes holes 337, 338, and 339 that allow access to the channels in the reformer section. Holes 337, 338, and 339 correspond to reformer outlets 128, sample outlets 126, and reformer inlets 124 of FIG. 4, respectively.

Referring now to FIG. 11, the reformer stack assembly 330 in one specific embodiment may be approximately 15.222 mm in width and between 2.54 and 5.15 mm in height. Due to the design of the reformer stack assembly 330, the micro-channels may be may be made wider than in prior art devices for similar temperature and pressure operating conditions while maintaining lower material stresses.

Figure 12:
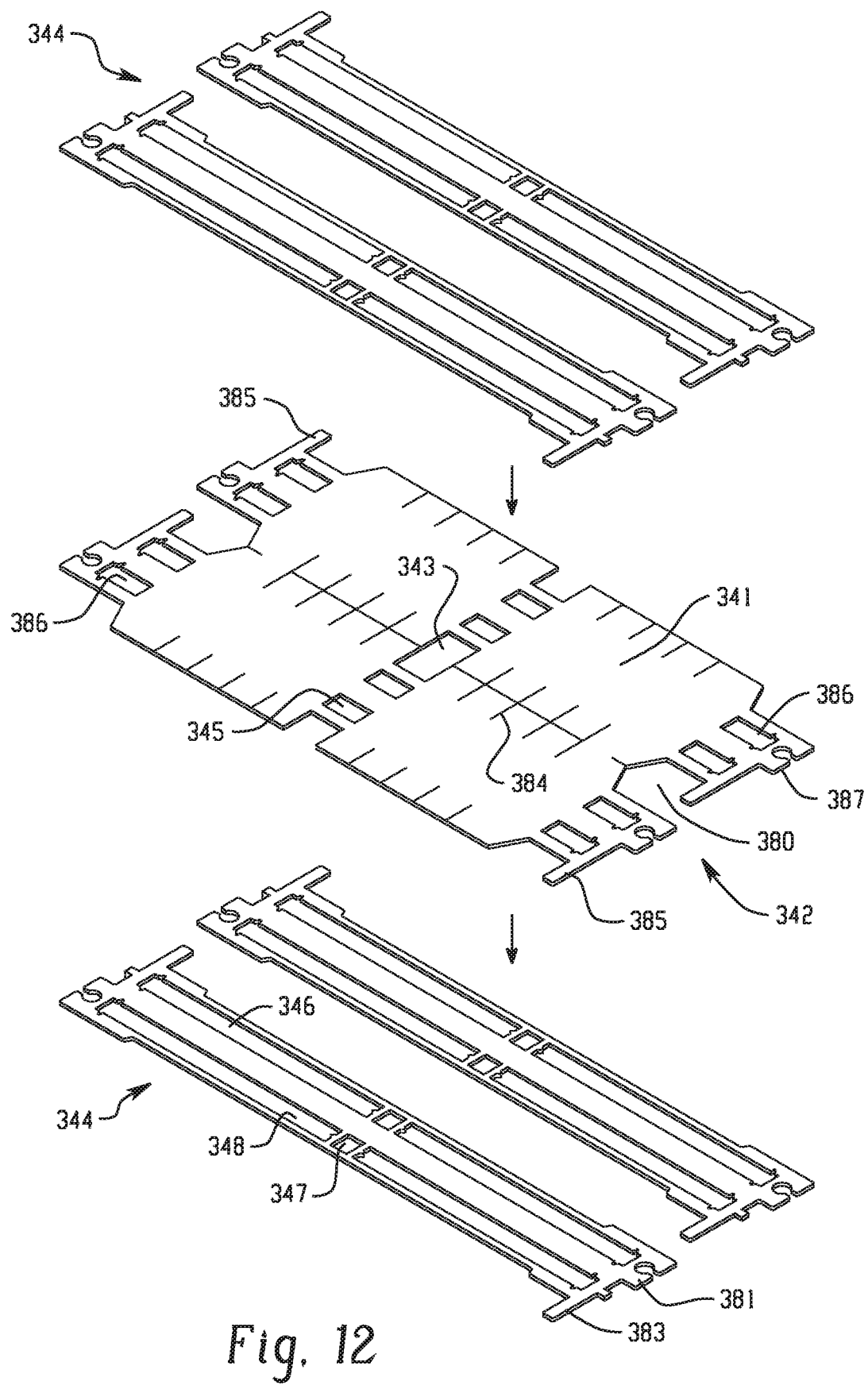
FIG. 12 is a diagram showing a shim stack for a reformer stack assembly, illustrated in an assembled view (left side) and an exploded view (right side) showing the separator shim and the channel shim.

FIG. 12 shows a partially exploded view of the shim stack 340 of FIG. 9. To properly interface with the top plate 332 and bottom plate 336, the bottom layer and the top layer of the shim stack 340 must be channel shims 344. As illustrated here, two channel shims 344 are used between each separator shim/fin 342. This allows the combustion gases to flow through the micro-channels formed by the channel shims.

Each channel shim 344 defines a first reaction micro-channel 346 and a second reaction micro-channel 348 with characteristic dimensions on the order of 0.5 to 2 mm in height and a width of 5 mm to 25 mm. A mixing manifold 347 is indicated in each micro-channel (as a square), and forms an orthogonal passageway/channel through which a sample volume can be obtained from the reaction channel (i.e. this is the channel to which sample outlet 126 of FIG. 1 connects). The channel shim also includes alignment tabs 383 on opposite corners, and notches 381 on opposite ends of the shim through which the alignment pins 335 are inserted.

Separator shim 342 serves to laterally conduct heat from a combustion gas pathway into reaction micro-channels 346, 348 through fin 341 which extends into and across the reaction channels when shims 342, 344 are stacked into the final alternating shim assembly 340. The separator shim is very similar in structure to the top plate 332 of FIG. 10. The separator shim includes a fin that provides a heat transfer surface. Two alignment tabs 385 are present along opposite sides of the separator shim which can be visually inspected during bonding to ensure that all shims are aligned properly. The separator shim includes four notches 387 in the corners through which the alignment pins 335 may be inserted. The separator shim also includes indent 380 (again shown as a triangular shape) on opposite ends as a visual indication of where the combustion channel will be located. Several slits 384 are made in the separator shim along the linear axis corresponding to the combustion channel. These slits allow for differential thermal expansion between the hotter fin material and the cooler reactor channel temperature. The slits also limit longitudinal conduction in the fin and improve heat transfer performance.

The separator shim 342 includes eight slots 386, four each on opposite ends along the linear axis. These slots align with the micro-channels 346, 348 of the channel shim 344. Referring to FIG. 4, these slots correspond to the locations for the reformer outlets 128 and the reformer inlets 124, and subsequently form vertical passageways at both ends of the reaction channel. A mixing manifold slot 345 is also included along the center of the shim, which is slightly more elongated along the linear axis than the mixing manifold 347 of channel shim 344. This extra length permits sample mixing as reformate passes between stacked shims 342, 344. A thermal slot 343 is also present along the center of the shim, extending slightly in the transverse axis. This thermal slot 343 permits mixing of combustion gases as they flow through the micro-channels 334 within reformer stack assembly 330. The thermal slot 343 may also be used to reduce heat transfer to the mixing manifold 347 where carbon formation may occur. The combination of reaction micro-channels forms the reaction channel, and the combination of combustion micro-channels forms the combustion channel. The slots 386 and indent 380 could be described as forming a transverse line at each end of the separator shim. The mixing manifolds 345 and thermal slot 343 could be described as forming a transverse line at a central portion of the separator shim.

Figure 13:
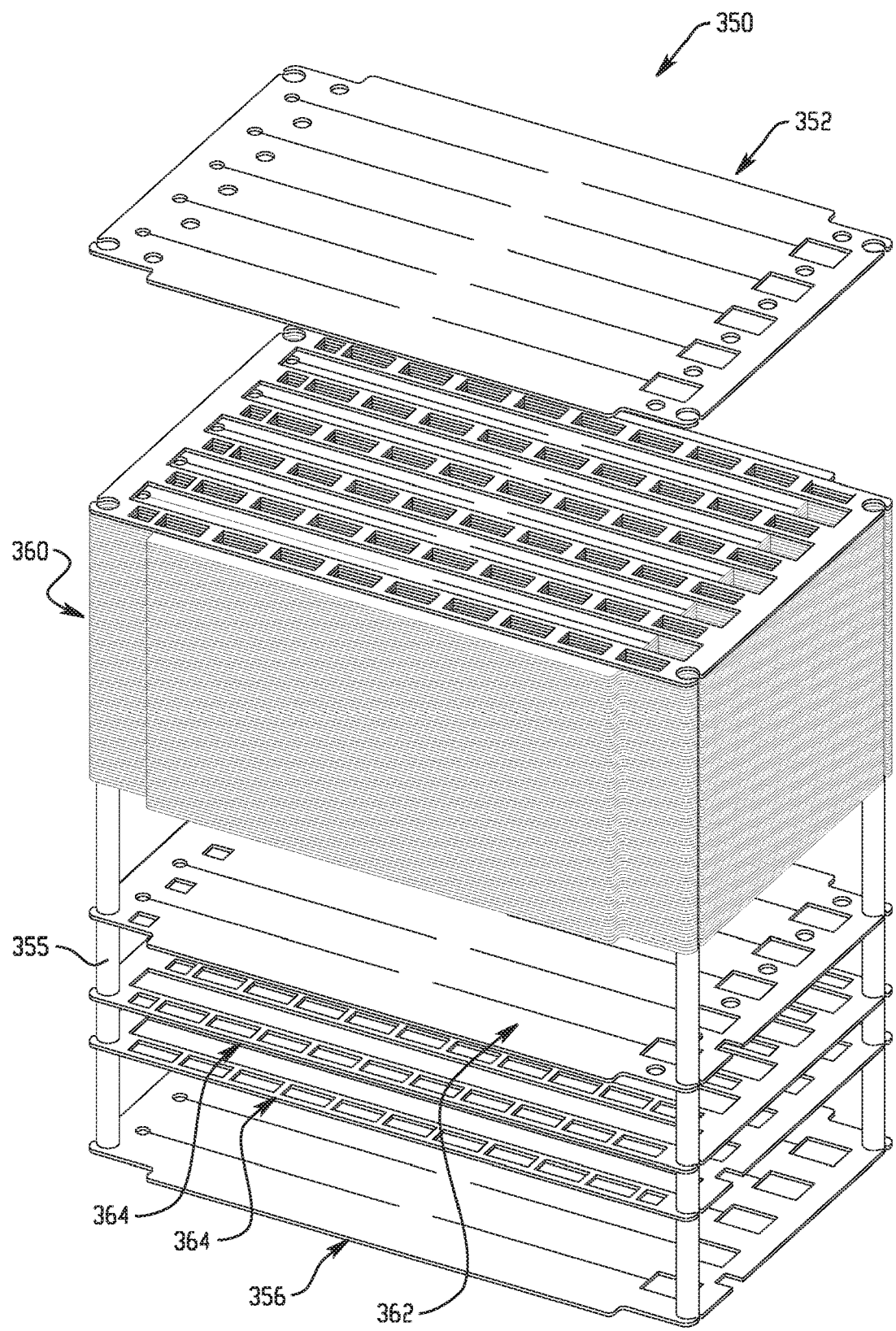
FIG. 13 is an exploded view showing an exemplary vaporizer stack assembly.

FIG. 13 shows an exploded view of a heat exchanger/vaporizer stack assembly 350. The vaporizer stack assembly 350 may be made in a similar manner as the reformer stack assembly 330 described in FIGS. 9-12. Top plate 352 is placed upon alternating shim stack 360, where the alternating shim stack includes 58 separator shims 362 and 118 channel shims 364 (as depicted here). Alignment pins 355 are used to guide the stacking of shims 362, 364 between plates 352, 356. As will be discussed further herein, here, two levels are made of channel shims 364, then one layer is made of separator shim 362, and the levels alternate in this manner.

Figure 14:
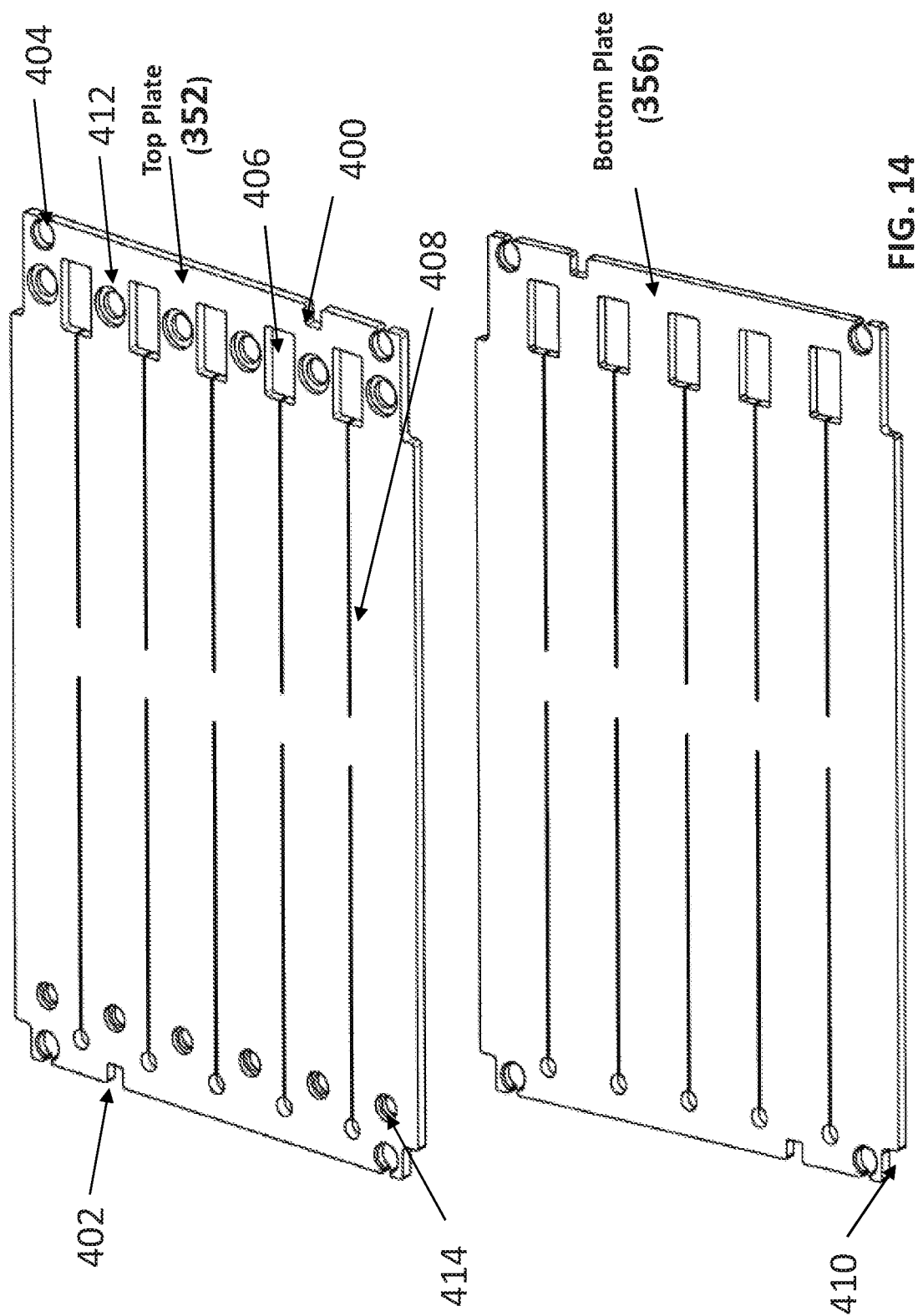
FIG. 14 is a perspective view of top and bottom vaporizer plates for the vaporizer stack assembly of FIG. 12.

FIG. 14 is a perspective view of the vaporizer top plate 352 and bottom plate 356. Plates 352, 356 may be manufactured from 11 gauge (0.120 mm) thick, 316/316L cold rolled & annealed stainless steel sheet. Scratches, deposits, and oxidation on the surface of plates 352, 356 should be avoided.

The top plate 352 and the bottom plate 356 are similar in many respects. Each plate includes two alignment notches 400, 402 which can be visually inspected during bonding to ensure that all shims 362, 364 in alternating shim stack 360 are aligned properly. The alignment notches 400, 402 are offset from each other, or in other words are on opposite ends and opposite sides of the shim. Each plate also includes four notches 404 on opposite ends through which the alignment pins 355 are inserted. Each plate also includes indents 406 (here having a rectangular shape) on one end as a visual indication of where the combustion channel will be located.

Several slits 408 are made in the plate along the linear axis corresponding to the combustion channel. The slits 408 may allow for differential thermal expansion between the hotter fin and the cooler reactor channel. The slits 408 also limit longitudinal conduction in the fin and improve heat transfer performance. In addition, alignment recesses 410 are present in the corners of the plates, which can interact with tabs on the interior of the casing to fix the stacks in place. The ends of the stack assembly will then be machined away to expose the micro-channels.

The top plate 332 also includes features that are not present on the bottom plate 336. More particularly, the top plate includes holes 412, 414 that correspond to vaporizer inlets 120 and vaporizer outlets 122 of FIG. 4, respectively.

With reference to FIG. 15, the bonded vaporizer stack assembly 350 in one embodiment may be approximately 5.11 mm in width and approximately 5.15 mm in height. Due to the design of the vaporizer stack assembly 350, the micro-channels may be may be made wider than in prior art devices for similar temperature and pressure operating conditions while maintaining lower material stresses.

Figure 16:
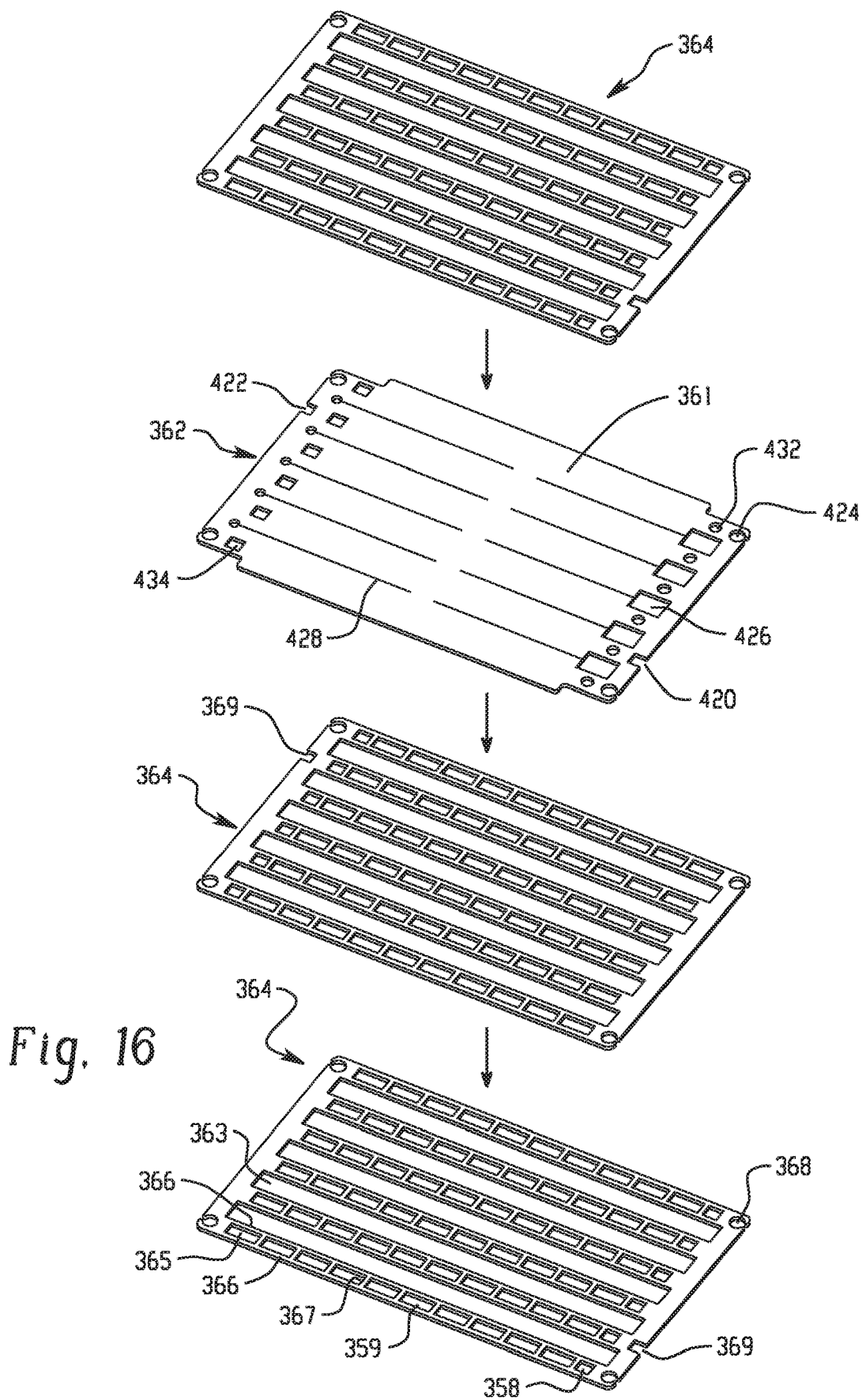
FIG. 16 is a diagram showing an alternating shim stack for a vaporizer stack assembly, illustrated in an assembled view (left side) and an exploded view (right side) showing the separator shim and the channel shims.

FIG. 16 is an exploded view of the alternating shim stack 360 of FIG. 13. In one embodiment, 118 channel shims 364 and 58 separator shims 354 are alternatingly stacked upon each other in a 2:1 ratio. The separator shim/fin 354 can be manufactured from 18 gauge (0.48 mm) thick 316/316L cold rolled and annealed stainless steel sheet or other materials appropriate to the operating temperature. The channel shim 364 can be manufactured from 26 gauge (0.018 mm) thick 316/316L cold rolled and annealed stainless steel sheet or other material appropriate to the operating temperature. The alternating shim stack 360 must begin and end with channel shims 364 to properly interface with top 352 and bottom 356 plates.

Each channel shim 364 is shaped to create a series of combustion micro-channels 363 and vaporizer micro-channels 365 extending between opposite ends of the shim. Combustion gas passes through the combustion micro-channels, while water flows through the vaporizer micro-channels and is converted to steam. Each vaporizer micro-channel 365 is formed by two longitudinal walls 366 which are joined together by at least one transverse support 367. This causes the vaporizer micro-channel to be separated into a series of chambers. All of the end chambers 358 at one a first end of the channel shim 364 are shorter in length than the other chambers 359. This is because the longitudinal walls 366 and the transverse support 367 are the same height. As a result, when two channel shims are stacked upon each other, but are rotated 180 degrees in the same plane with respect to each other, the end chambers 358 are on opposite ends of the vaporizer channel 365. This permits water to flow up and down over the transverse supports, which would otherwise act as barriers to fluid flow, and travel in a tortuous path all the way through the micro-channel. Put another way, the channel shims must be rotated about the lateral axis or flipped along the transverse axis, not flipped along the longitudinal axis.

Thus, the channel shim includes only one notch 369 on one end of the shim. This provides another visual indicator to confirm that the channel shims are properly stacked upon each other. Thus, the alternating stack 360 includes two levels of channel shims 364, then one level of separator shim 362, then two levels of channel shims 364, etc. Each channel shim 364 also includes four notches 368 in the corners through which the alignment pins 355 may be inserted. The combination of vaporizer micro-channels forms the vaporizer water channel, and the combination of combustion micro-channels forms the combustion channel.

Separator shim 362 serves to laterally conduct heat from a combustion gas pathway into vaporizer water channels through fin 361 which extends into and across the water channels when shims 362, 364 are stacked into the final alternating shim assembly 360. The separator shim 362 is very similar to the top plate 352 in many respects except thickness. The shim includes two alignment notches 420, 422 which can be visually inspected during bonding to ensure that all shims 362, 364 in alternating shim stack 360 are aligned properly. The alignment notches 420, 422 are offset from each other, or in other words are on opposite ends and opposite sides (i.e. opposing corners) of the shim. Each plate also includes four notches 424 in the corners through which the alignment pins 355 are inserted. Each plate also includes indents 426 (here having a rectangular shape) on one end as a visual indication of where the combustion channels will be located. Several slits 428 are made in the plate along the linear axis corresponding to the combustion channels to permit differential thermal expansion. Slots 432, 434 are provided that correspond to vaporizer inlets 120 and vaporizer outlets 122 of FIG. 4, respectively.

Again, the assembly forms two types of channels, water channels and combustion channels. The water channels (formed from the micro-channels 365) will have a horizontal flowpath and two orthogonal (i.e. vertical) passageways, while the combustion channels (formed from the micro-channels 363) will have only a horizontal flowpath and does not have vertical passageways.

The processing capacity of the heat exchangers and fuel processors described herein can be scaled as desired to any convenient size in at least two different ways. First, the alternating channel shims and separator shims can be stacked vertically to any desired height to provide the requisite number of channels and change the size of the reformer/vaporizer. Alternatively, the total number of channels defined by the channel shims and separator shims can be increased to provide the desired capacity. For example, the embodiment of FIG. 12 has four reaction channels, and the embodiment of FIG. 16 has six reaction channels. In other words, the device can be made either taller or wider.

Figure 17:
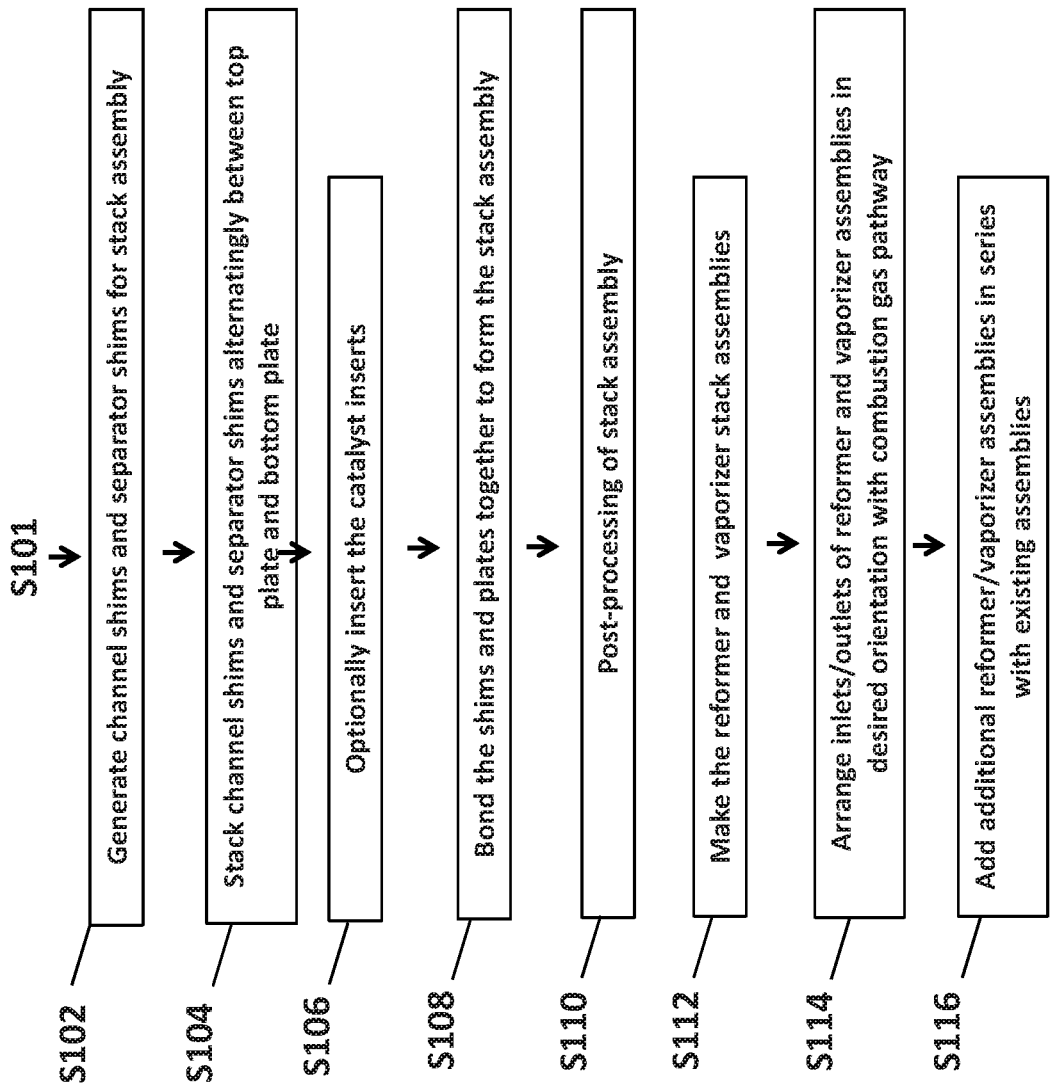
FIG. 17 is a flow diagram for methods for forming a fuel processor.

FIG. 17 is a chart illustrating a general method for forming a reactor, which starts at S101. First, the stack assemblies that make up the reformer and the vaporizer are made. At S102, the channel shims 344, 364 and separator shims 342, 362 for the respective assembly are generated. At S104, the channel shims 344, 364 and separator shims 342, 362 are stacked alternatingly between the top plate 332, 352 and the bottom plate 336, 356. In optional step S106, catalyst inserts may be inserted into the desired channels (see discussion of FIG. 21 below). Next, at S108, the shims and plates are bonded together to form the stack assembly 330, 350. Bonding may occur through diffusion bonding, with or without the help of alignment pins 335. At S110, post-processing of the stack assembly occurs. This may entail removing excess material, opening manifolds, and attaching appropriate flow connections.

Next, the reactor can be formed. At S112, the reformer assembly and the vaporizer assembly are made, as described above. At S114, the inlets and outlets of the reformer and vaporizer assemblies 340, 360 are arranged so that reactants/water flow counter-current or co-current past the combustion channels in the two assemblies. The arrangement may involve binding the assemblies to the manifold or casing 119, 219 of a fuel processor assembly 110, 210, inserting the inlet/outlet tubes, and connecting the reactant/water supply sources to the appropriate end of the assemblies. At S116, if desired, additional reformer assemblies 340 can be arranged in series with the reformer assembly 340 to increase the output of hydrogen gas produced by the fuel processor. This may be performed to meet greater fuel input demands by a fuel cell assembly 181, 281 capable of generating more electricity. Additional vaporizer assemblies 360 may also be added in series with the reformer assemblies 340 to provide more hot steam input to reformer assemblies 340.

Figure 18:
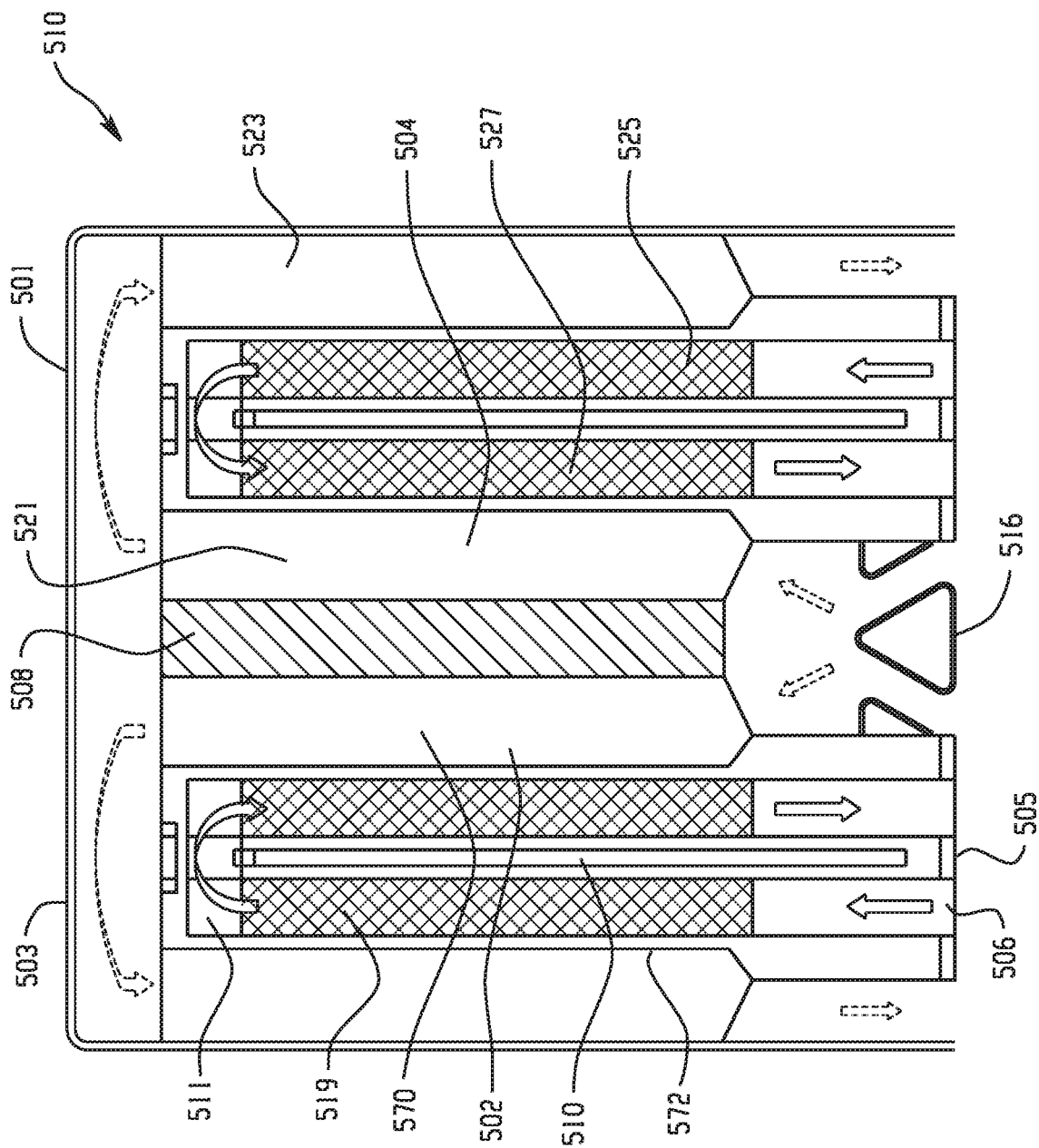
FIG. 18 is a conceptual diagram of a third exemplary embodiment of a fuel processor of the present disclosure. In this embodiment, the channels in the reformer and vaporizer are arranged to provide a U-shaped flow.
Figure 19:
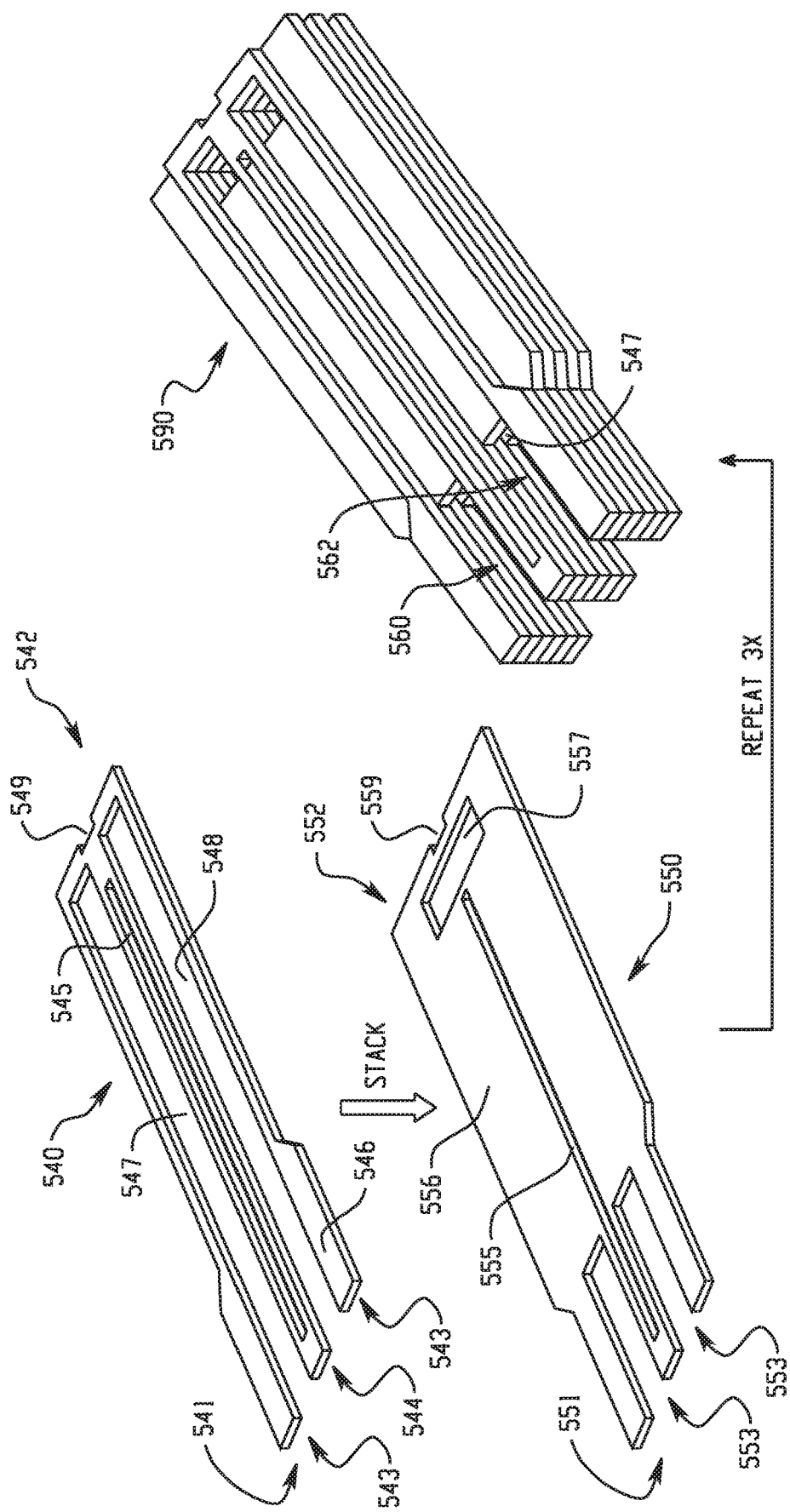
FIG. 19 is a diagram of an alternating reformer shim stack used in the embodiment of FIG. 18, illustrated in an assembled view (right side) and an exploded view (left side) showing the separator shim and the channel shim.

FIG. 18 is a plan view of a third exemplary embodiment of a fuel processor 510 having counter-current flow between the combustion gas and the reactants/water. This embodiment differs from the prior embodiments in that the flow path is U-shaped, rather than linear. Put another way, the burner and the exhaust port are on the same end of the casing instead of on opposite ends. This embodiment shows only the half of the fuel processor that contains the reformer section; the other half is of a similar construction but contains the vaporizer section. FIG. 19 shows a channel shim and a separator shim used in this embodiment, which may be helpful in visualizing the flow paths.

A burner 516 provides hot combustion gas which flows (indicated as dotted arrow) through two combustion channels 502, 504. The combustion channels are optionally separated by a separator panel 508, which may be a ceramic panel used to direct hot combustion gas flow through the combustion channels. The ceramic panel may also radiate thermal energy to increase net heat transfer in the combustion channel. As shown here, each combustion channel 502, 504 starts near the center of the processor and travels down a first leg 521 from the burner to the opposite end 501 of the casing. The combustion channel then makes a U-turn and returns down a second leg 523 to the burner end 505 of the casing 503 near the outside of the processor.

A reaction channel 506 is surrounded by the combustion channel 502. The reaction channel also has a first leg 525 and a second leg 527. As illustrated here (solid arrows), the steam/fuel mixture enters the reaction channel at the burner end near the outside of the processor and flows counter-current to the combustion gas down the first leg. At the opposite end 501, the reaction channel makes a U-turn and returns to the burner end 505 near the center of the processor in the second leg. A central slot 511 is present here. Catalyst 519 is present within the reaction channel, as described above with respect to FIG. 5.

At the center of the reaction channel 506 is a separating wall 510. The U-turn for the reaction channel goes around this separating wall. As seen later, the separating wall serves to align the shims of this processor.

As noted above, FIG. 18 shows only the section of the processor that performs reformation. The section of the processor that contains the vaporizer and produces the steam has essentially the same construction. The only difference is that instead of a steam/fuel mixture entering the reaction channel 506, water enters the vaporizer channel of the vaporizer. The steam is then produced by heat transfer from the combustion channel of the vaporizer. The vaporizer and reformer sections can share the same burner, which provides the combustion gas to both sections. The two sections would be separated from each other by a wall. Alternatively, hot combustion gas leaving the reformer can be directed to a vaporizer so that the vaporizer is essentially in series with the combustion gases of the reformer.

Referring now to FIG. 19, a perspective view of the channel shim 540 (top left) and the separator shim 550 (bottom left) are provided, along with a partial assembly view (right side) of the heat exchanger assembly 590 formed therefrom.

The channel shim 540 has an entry end 541 and a return end 542. There are two outer walls 543 and a central wall 544 having an alignment slot 545. These walls create two micro-channels 547, 548. Two wings 546 are present extending from the outer walls 543 on the entry end 541. A notch 549 is present on the outer edge of the return end aligned with the central wall 544.

The separator shim 550 has an entry end 551 and a return end 552. The entry end includes two recesses 553 that align with the micro-channels in the channel shim. An alignment slot 555 is present in the center, and aligns with the alignment slot 545 of the channel shim. The return end can be described as having fins 556. A central slot 557 is located at the return end, and aligns with the micro-channels in the channel shim. A notch 559 is present on the center of the outer edge of the return end.

As seen on the right side of FIG. 19, the channel shim 540 and separator shim 550 are alternated. Their alignment slots 545, 555 align so that the separating wall 510 passes through the slots. The reformate will first pass through the micro-channel 547. At the return end 542, 552, the reformate can pass through the central slot 557 to move from micro-channel 547 to micro-channel 548 and flow back towards the entry end. The reformate inlet 560 and reformate outlet 562 are marked. The combustion channel is on the exterior, surrounding the reformate channel 547/548.

In this regard, because the combustion channel contains relatively hotter combustion gas on the beginning leg compared to the return leg, the reformer can be divided into a hot side and a cold side (hot and cold being relative terms). Referring back to FIG. 19, the hot side 570 is proximate the center of the processor, while the cold side 572 is near the outside of the processor. It should be noted that the separator shim 550 will transfer heat laterally from the hot side to the cold side as the combustion gas travels from the burner to the opposite end 501 of the casing. The resulting heat gradients in the reaction channel 506 are designed so that relatively hotter reformate passes through the hot side 570, so that overall the reformate is more gently heated. This should reduce excessive carbon deposits on catalyst 519.

In one embodiment of fuel processor 510, the channel shims 540 are fabricated from 0.040 inch thick sheet while the separator/fin shims 550 are made from 0.050 inch thick sheet, allowing the combustion channels 502, 504 to see a stack of fins spaced 0.040 inch apart which provides significant extended heat transfer surface area. The thicker separator/fin shims 550 allow for effective heat transfer using high temperature materials, e.g. Inconel and the like, that have low thermal conductivity.

In another embodiment of fuel processor 510, the catalyst 519 is supplied on shims that are approximately 3½ inches long and ⅜ inch wide. In yet another embodiment, the catalyst 519 adopts an alternative configuration with longer, narrower shims. A larger catalyst 519 insert width is convenient for insertion into long reaction channels. Because the pressure above and below the separator shim 550 is the same, there is no strength issue with additional catalyst 519 as long as heat from hot combustion gas can be transferred effectively to the catalysts 519. In yet another embodiment of fuel processor 510, the catalyst 519 inserts are expanded metal that have been corrugated parallel to the reaction channels to provide consistent flow space. The catalyst 519 insets could be a variety of different shapes and supports. Alternatively, the catalyst 519 can be an insert positioned vertically across the center of the channel inlets on a support such as a thin rod. This aspect is further described in FIG. 21 below.

Figure 20:
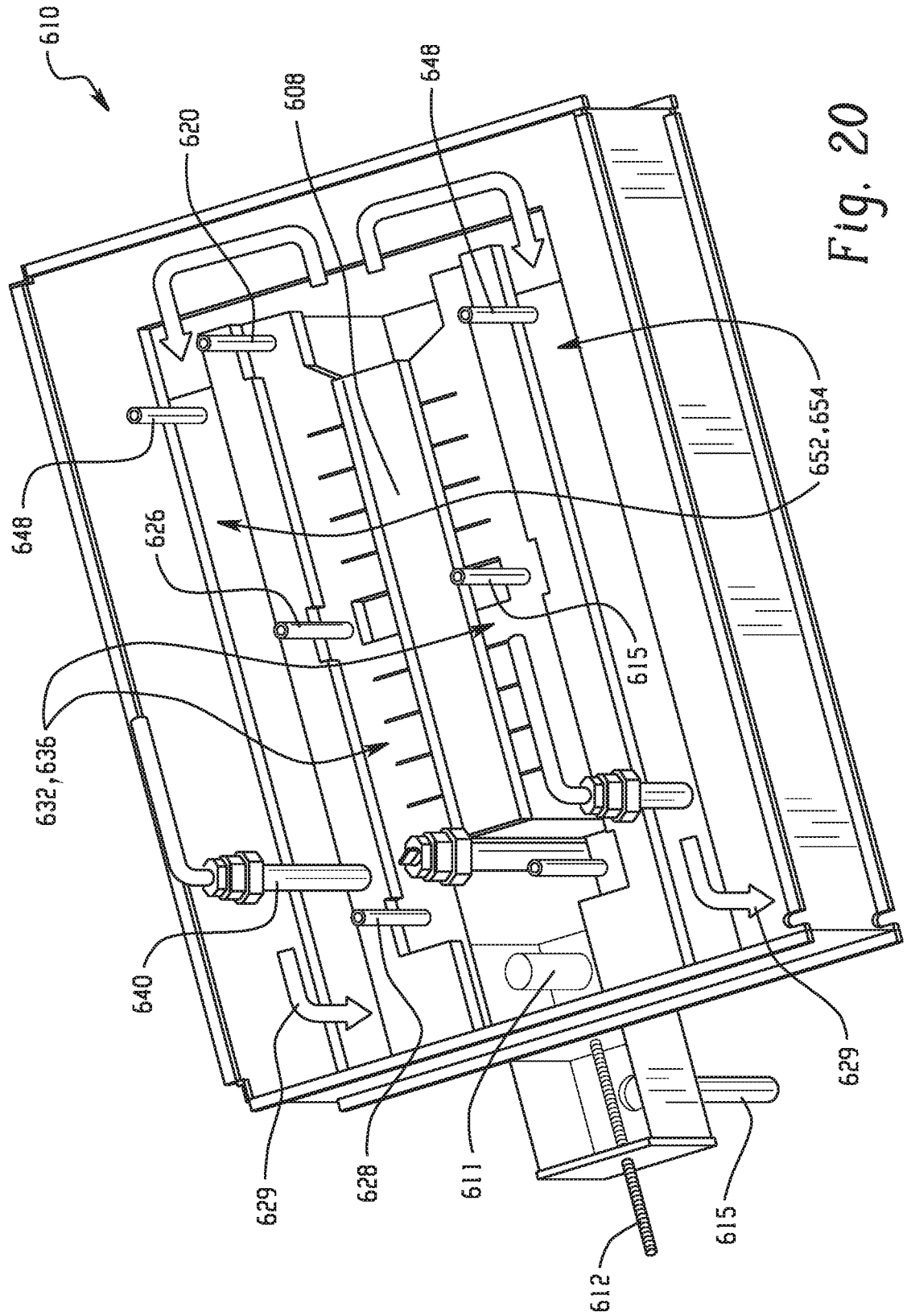
FIG. 20 is a model of a fourth exemplary embodiment of a fuel processor of the present disclosure, wherein the reformer and vaporizer sections are placed side-by-side.

FIG. 20 shows a fourth exemplary embodiment of a fuel processor 610 that allows for counter-current flow of reactant and combustion gases while having a non-linear arrangement of reformation reactors and vaporizers. Fuel processor 610 may be expanded in width, rather than length, to include more reformer sections and/or vaporizer sections as it is scaled up for more commercial applications. This embodiment differs from that of FIG. 18 in that the reformer and vaporizer sections are each linear (rather than including a U-turn) and the entire processor is shown (not just half of the processor). Generally, a square cross-section (to gas flow) is desired for minimal heat loss. Thus, the vaporizer/reformer section height is first increased, then the number of vaporizer/reformer sections side-by-side (i.e. width), then the number of vaporizer/reformer sections in series is increased.

Fuel processor 610 includes burner 611 which receives air from air inlet 615 and gas from gas inlet 612 to produce hot combustion gas. The flow of hot combustion is directed to reformer sections 632, 636 by an optional separator plate 608 gas and moves across reformer sections 632, 636 in a direction away from burner 111. While combustion gas flows, reformer sections 632, 636 receive reformate at reformate inputs 620. Reformate flows counter-current to hot combustion gas towards reformate outlets 628. Sample points 626 are located mid-way through reformer sections 632, 636 to allow the progress of the underlying reformation reaction to be assessed. Put another way, the reformate outlets 628 are proximate the burner 611.

After flowing past reformer sections 632, 636, the hot combustion gas makes a U-turn (indicated by arrow) and travels in the opposite direction towards exhaust points 629. While combustion gas flows in the opposite direction, vaporizer sections 652, 654 receive water at vaporizer inlets 640. Water flows counter-current to the hot combustion gas towards the vaporizer outlets 648. Put another way, the vaporizer inlets are proximate the burner 611. After flowing past the vaporizer sections, the hot combustion gas leaves fuel processor 610 at exhaust points 629.

Figure 21:
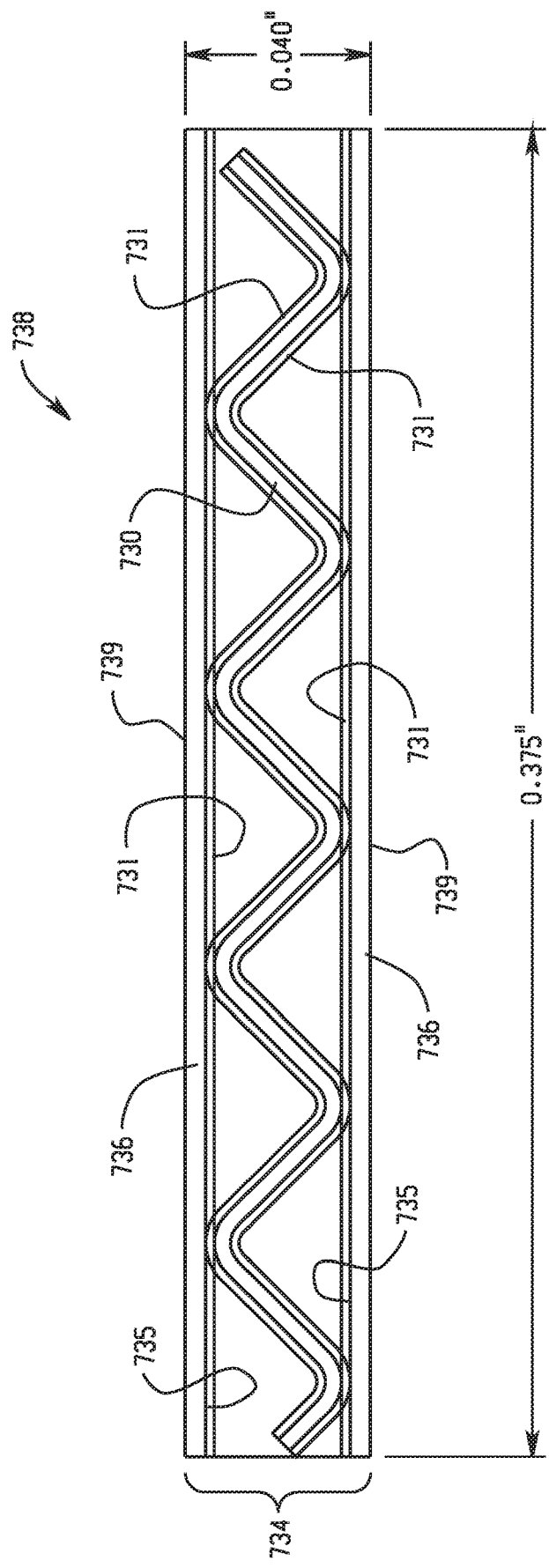
FIG. 21 is a cross-sectional view of an exemplary embodiment of a catalyst insert which can be inserted into a channel of the reformer or the vaporizer.

FIG. 21 is a conceptual drawing of an exemplary embodiment of a catalyst insert 734 that could be used to place catalyst within a channel. Referring back to FIG. 19, this insert would be placed within the channel defined by two separator shims and one channel shim.

The corrugated catalyst insert 734 includes a corrugated center piece 730 that is coated on at least one side (and usually both) with catalyst 731. The corrugated insert 734 is sandwiched between two flat shims 736. The inner surface 735 of each shim 736 is also illustrated as being coated with catalyst 731. This insert is then placed into the channel, with the outer surface 739 of each shim 736 contacting the sides of the channel (not shown). Alternatively, the side shims 736 may be removed, and the catalyst insert may be only the corrugated center piece 730. It is also contemplated, as previously noted, that catalyst could be coated directly upon the channel shim and separator shims that make up the channel.

Catalyst-coated corrugated materials may be preferable due to open flow passages yielding low pressure drop and good catalyst contacts. The corrugated catalyst insert 734 may be suitable for insertion into reaction channels 134, 135, 138, 139 in the fuel processor 110 of FIG. 5, or in the fuel processor 210 of FIG. 8 and the fuel processor 610 of FIG. 20.

The various heat exchanger and fuel processor designs illustrated herein are particularly useful for certain reactions which require a managed temperature gradient to avoid "thermal shock". For example, steam reforming of higher hydrocarbons is a reaction that is particularly sensitive to rapid heating (e.g. $C_{12}H_{26}+12H_2O \rightarrow 12CO+25H_2$). Contact with hot surfaces (needed for rapid heating) can cause cracking of the hydrocarbon molecule and deposition of carbon leading to deactivation of the catalyst and plugging of the channels in the reactor. Counter-current flow heats the steam/hydrocarbon mixture more gently with a lower temperature gradient (compared to co-current or cross-current flow type heat exchangers) until the reforming reaction is reasonably well underway. After some hydrogen and CO have been created from the reforming reaction, carbon formation is less likely and the heating can continue at higher temperatures. The hydrocarbon/steam mixture enters the reactor channel and is exposed to a relatively low temperature, and the temperature then increases through the length of the channel.

Another exemplary reaction where a managed temperature gradient is useful is water-gas shift: $CO+H_2O \rightarrow CO_2+H_2$. This reaction favors hydrogen production at low temperatures, but reaction rates are slow. The overall size of the heat exchanger may be minimized in some cases by initiating the reaction at a high temperature and gradually reducing the temperature as the reaction proceeds. In this case, the reactants enter one reactor channel at a high temperature, and temperature decreases through the length of the channel, a coolant being used in counter-current flow to obtain the temperature gradient. Again, however, although counter-current flow is used in the figure to illustrate the operation of the heat exchangers and reactors, co-current flow is also contemplated.

As previously stated, the heat exchangers of the present disclosure may be made from the regular assembly of different shims that are punched through, stacked in a regular pattern, and bonded. FIGS. 10-17 illustrate different possible configurations for forming the heat exchangers by bonding. Bonding may be by diffusion bonding (a well-known industrial process) or brazing (also well known), with diffusion bonding being preferred for high temperature reactions. Another feature of the assemblies disclosed herein is that when diffusion bonding occurs, there are no "unsupported bond areas". The diffusion bonding process presses the shims together with significant force and at high temperature. The catalyst may be inserted into the reactor channels after bonding as pre-coated inserts, may be inserted either before bonding, or the catalyst can be coated in-situ. Whether or not the catalyst can be inserted before bonding depends on the catalyst type and the bonding atmosphere. Generally, diffusion bonding temperature may be detrimental to catalyst performance; hence, it may be advantageous to install the catalyst after bonding.

As previously stated, longer channels are generally preferred, because they permit more gradual heating. However, practical limitations on catalyst insertion or fabrication equipment size may limit the length of a given channel. However, channels may be formed in series, sometimes with an opportunity for inter-channel mixing between sets of channels. Thus, an effective length/width ratio can be any desired value without practical limitation. For example, the channels 138, 139 in the fuel processor 110 of FIG. 5 can each be 3.5 inches long, and are connected in series to each other through tubing. This configuration heats the first set of channels 138 to a relatively high temperature to perform initial reforming then introduces the partially reformed gas into the second set of channels 139 at relatively high temperature to complete the reforming reaction. This is essentially a parallel series configuration where the combustion path channels 133, 137 are parallel to the reaction channels 138, 139, but the reaction channels are in series with each other. The embodiment of FIG. 5 has proven to be effective and yields a more compact overall system configuration with lower overall heat loss, and additionally better efficiency.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A heat exchanger, comprising:
a first channel having a flowpath, a first wall, a second wall opposite the first wall, an inlet manifold at a first end, and an outlet manifold at a second opposite end, the inlet manifold and the outlet manifold running orthogonal to the flowpath, and a mixing manifold within the first channel running orthogonal to the flowpath, wherein the first channel comprises a plurality of first micro-channels and the mixing manifold permits vertical mixing between first micro-channels; and
a second channel having a flowpath parallel to the flowpath of the first channel, the first channel and the second channel being separated by the first wall.

2. The heat exchanger of claim 1, further comprising a fin extending from the second channel into the first channel, the fin passing through the first wall and extending to the second wall.

3. The heat exchanger of claim 1, wherein the ratio of a first micro-channel width to a first micro-channel height is from 2:1 to 20:1 for each first micro-channel in the plurality of first micro-channels.

4. The heat exchanger of claim 1, wherein the second channel comprises a plurality of second micro-channels.

5. The heat exchanger of claim 1, wherein the heat exchanger is formed from a channel shim and a separator shim, wherein the channel shim defines the first channel, and wherein the separator shim includes a fin; and
wherein the channel shim and the separator shim cooperate to form the first wall.

6. The heat exchanger of claim 5, wherein the ratio of a channel shim height to a separator shim height is from 0.125 to 8.

7. The heat exchanger of claim 5, wherein the channel shim comprises at least one first micro-channel in the plurality of first micro-channels extending from a first end of the channel shim to a second end of the channel shim.

8. The heat exchanger of claim 7, wherein the at least one first micro-channel of the channel shim further comprises a mixing manifold that partially defines the mixing manifold within the first channel.

9. The heat exchanger of claim 7, wherein the separator shim further comprises slots that align with the at least one first micro-channel of the channel shim.

10. The heat exchanger of claim 7, wherein the at least one first micro-channel of the channel shim is formed from two longitudinal walls joined together by at least one transverse support, the at least one first micro-channel thus being separated into a series of chambers, wherein the chamber at a first end of the at least one first micro-channel is shorter in length than the other chambers.

11. The heat exchanger of claim 5, wherein the channel shim further comprises alignment tabs on opposite corners.

12. The heat exchanger of claim 5, wherein the channel shim further comprises notches on opposite ends.

13. The heat exchanger of claim 5, wherein the separator shim further comprises a mixing manifold slot that partially defines the mixing manifold within the first channel.

14. The heat exchanger of claim 5, wherein the channel shim comprises: an entry end and a return end; two outer walls and a central wall that define two first micro-channels in the plurality of first micro-channels; and an alignment slot in the central wall.

15. The heat exchanger of claim 14, wherein the separator shim comprises: an entry end and a return end; a central slot at the return end; two recesses at the entry end that align with the two first micro-channels of the channel shim; and an alignment slot that aligns with the alignment slot of the channel shim.

16. The heat exchanger of claim 1, wherein the first channel includes a catalyst.

17. The heat exchanger of claim 16, wherein the catalyst is inserted into the first channel as a catalyst insert.

18. The heat exchanger of claim 17, wherein the catalyst insert comprises a corrugated center piece coated on at least one side with the catalyst.

19. The heat exchanger of claim 18, wherein the corrugated center piece is sandwiched between two flat shims, and an inner surface of each flat shim is also coated with the catalyst.

* * * * *